US008537931B2

(12) United States Patent
Park et al.

(10) Patent No.: US 8,537,931 B2
(45) Date of Patent: Sep. 17, 2013

(54) METHODS AND APPARATUS FOR SYNCHRONIZATION AND DETECTION IN WIRELESS COMMUNICATION SYSTEMS

(75) Inventors: Jong Hyeon Park, San Jose, CA (US); Bok Tae Sim, San Ramon, CA (US); Tae Ryun Chang, Santa Clara, CA (US); Je Woo Kim, Cupertino, CA (US); Ju Won Park, San Jose, CA (US); Chae Kwan Lee, San Jose, CA (US); Sameer Nanavati, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1015 days.

(21) Appl. No.: 11/969,330

(22) Filed: Jan. 4, 2008

(65) Prior Publication Data

US 2009/0175394 A1 Jul. 9, 2009

(51) Int. Cl.
*H03K 9/00* (2006.01)
*H04L 27/00* (2006.01)

(52) U.S. Cl.
USPC ............ 375/316; 375/260; 375/326; 375/354

(58) Field of Classification Search
USPC .................. 375/316, 354, 326, 260, 324, 340
See application file for complete search history.

(56) References Cited

U.S. PATENT DOCUMENTS

| | | | |
|---|---|---|---|
| 5,852,630 A | 12/1998 | Langberg et al. | |
| 6,208,695 B1 | 3/2001 | Klank et al. | |
| 6,219,333 B1 | 4/2001 | Ahn | |
| 6,363,084 B1 | 3/2002 | Dejonghe | |
| 6,707,856 B1 | 3/2004 | Gardner et al. | |
| 6,807,241 B1 | 10/2004 | Milbar et al. | |
| 6,959,050 B2 | 10/2005 | Baum et al. | |
| 7,039,581 B1 | 5/2006 | Stachurski et al. | |
| 7,058,147 B2 | 6/2006 | Erving et al. | |
| 7,116,745 B2 | 10/2006 | Fanson et al. | |
| 7,203,245 B1 * | 4/2007 | Murphy | 375/260 |
| 7,236,554 B2 | 6/2007 | Gupta | |
| 7,251,282 B2 * | 7/2007 | Maltsev et al. | 375/260 |
| 7,423,984 B2 | 9/2008 | Hasegawa et al. | |
| 7,502,311 B2 | 3/2009 | Song et al. | |

(Continued)

FOREIGN PATENT DOCUMENTS

| | | |
|---|---|---|
| CN | 1879321 A | 12/2006 |
| EP | 1424789 A1 | 6/2004 |

(Continued)

OTHER PUBLICATIONS

Bhatt, T. et al.: "Initial Synchronization for 802.6e Downlink," Signals, Systems and Computers, 2006. ACSSC '06. Fortieth Asiloma R Conference on, IEEE, PI, Oct. 1, 2006, pp. 701-706, XP031081135, ISBN: 978-1-4244-0784-2.

(Continued)

*Primary Examiner* — Ted Wang
(74) *Attorney, Agent, or Firm* — Charles Chesney

(57) ABSTRACT

A synchronization and detection method in a wireless device may include performing coarse detection and synchronization with respect to a received signal. The synchronization and detection method may also include performing fine detection and synchronization for acquisition of the received signal. Results of the coarse detection and synchronization may be used for the fine detection and synchronization. The synchronization and detection method may also include performing tracking mode processing when the acquisition of the received signal has been achieved.

45 Claims, 16 Drawing Sheets

(56) References Cited

U.S. PATENT DOCUMENTS

| | | | |
|---|---|---|---|
| 7,577,210 B2 * | 8/2009 | Lee | 375/267 |
| 7,813,442 B2 | 10/2010 | Gaikwad | |
| 7,894,539 B2 | 2/2011 | Lin et al. | |
| 8,045,636 B1 | 10/2011 | Lee et al. | |
| 8,107,561 B2 | 1/2012 | Huang et al. | |
| 2004/0246998 A1 * | 12/2004 | Ma et al. | 370/527 |
| 2006/0062196 A1 | 3/2006 | Cai et al. | |
| 2006/0071851 A1 | 4/2006 | Graas et al. | |
| 2006/0078040 A1 | 4/2006 | Sung et al. | |
| 2006/0133321 A1 | 6/2006 | Lim et al. | |
| 2006/0233097 A1 | 10/2006 | Vrcelj et al. | |
| 2006/0239179 A1 | 10/2006 | Berkeman et al. | |
| 2006/0245349 A1 | 11/2006 | Vrcelj et al. | |
| 2007/0058693 A1 | 3/2007 | Aytur et al. | |
| 2007/0280098 A1 * | 12/2007 | Bhatt et al. | 370/208 |
| 2008/0101495 A1 | 5/2008 | Gaikwad | |
| 2008/0107200 A1 | 5/2008 | Zhu et al. | |
| 2008/0107220 A1 | 5/2008 | Park et al. | |
| 2009/0060101 A1 | 3/2009 | Liu | |
| 2009/0154627 A1 | 6/2009 | Park et al. | |
| 2010/0128630 A1 | 5/2010 | Barak et al. | |
| 2011/0293040 A1 | 12/2011 | Dupont et al. | |

FOREIGN PATENT DOCUMENTS

| | | |
|---|---|---|
| EP | 1755299 A2 | 2/2007 |
| JP | 2000151528 A | 5/2000 |
| JP | 2001237754 A | 8/2001 |
| JP | 2002368717 A | 12/2002 |
| JP | 2006180518 A | 7/2006 |
| JP | 2008503186 A | 1/2008 |
| JP | 2008236744 A | 10/2008 |
| RU | 2149509 | 5/2000 |
| RU | 2157592 | 10/2000 |
| RU | 2168278 | 5/2001 |
| RU | 2221330 C2 | 1/2004 |
| RU | 2232469 C2 | 7/2004 |
| RU | 2233033 | 7/2004 |
| RU | 22313-1450 | 3/2007 |
| WO | WO9610873 | 4/1996 |
| WO | WO9635268 | 11/1996 |
| WO | WO9849857 A1 | 11/1998 |
| WO | WO0035117 | 6/2000 |
| WO | WO02080600 A1 | 10/2002 |
| WO | WO2005101780 A1 | 10/2005 |
| WO | 2005122717 A2 | 12/2005 |
| WO | WO2006115368 A1 | 11/2006 |
| WO | 2007138453 | 12/2007 |
| WO | WO2007138456 A2 | 12/2007 |

OTHER PUBLICATIONS

Manusani, S. K. et al.: "Robust Time and Frequency Synchronization in OFDM based 802.11a WLAN Systems," Annual India Conference, 2006, IEEE, PI, Sep. 1, 2006, pp. 1-4, XP031042626, ISBN: 978-1-4244-0369-1.

International Search Report, PCT/US2008/070355—International Search Authority—European Patent Office—Nov. 3, 2008.

Written Opinion, PCT/US2008-070355—International Search Authority—European Patent Office—Nov. 3, 2008.

IEEE, "Air Interface for Fixed Broadband Wireless Access System," Draft Standard, May 2004, 915 pages, P802.16-REVd/D5-2004, Part 16, New York, New York.

IEEE, "Corrigendum to IEEE Standard for Local and Metropolitan Area Networks—Part 16: Air Interface for Fixed Broadband Wireless Access Systems," Draft Standard, Sep. 12, 2005, 288 pages, P802.16/2004/Cor1/D5, New York, New York.

IEEE, "Part 16: Air Interface for Fixed Broadband Wireless Access Systems. Amendment for Physical and Medium Access Control Layers for Combined Fixed and Mobile Operation in Licensed Bands," Draft Standard, Oct. 14, 2005, 684 pages, P802.16e/D12, New.

Jiho Jang et al., "A Common SYNC Symbol for FFT sizes other than 2048", Publication, Aug. 27, 2004 and Sep. 20, 2004, 8 pages, IEEE 802.16 Broadband Wireless Access Working Group.

Kang et al., "Robust OFDMA Frame Synchronization Algorithm on Inter-Cell Interference," 2006 Asia-Pacific Conference on Communications, Aug. 1, 2006, pp. 1-5, ISSN: 978-1-4244-0573-2.

Um et al., "A Robust Timing Synchronization Algorithm for OFDM Systems over Multipath Rayleigh Fading Channels," IEICE Transactions on Fundamentals of Electronics, Communications and Computer Sciences, Jun. 1, 2006, pp. 1705-1709, vol. E89-A, No. 6, Engineering Sciences Society, Tokyo, JP, XP001243110.

Taiwan Search Report—TW097128487—TIPO—Oct. 11, 2012.

* cited by examiner

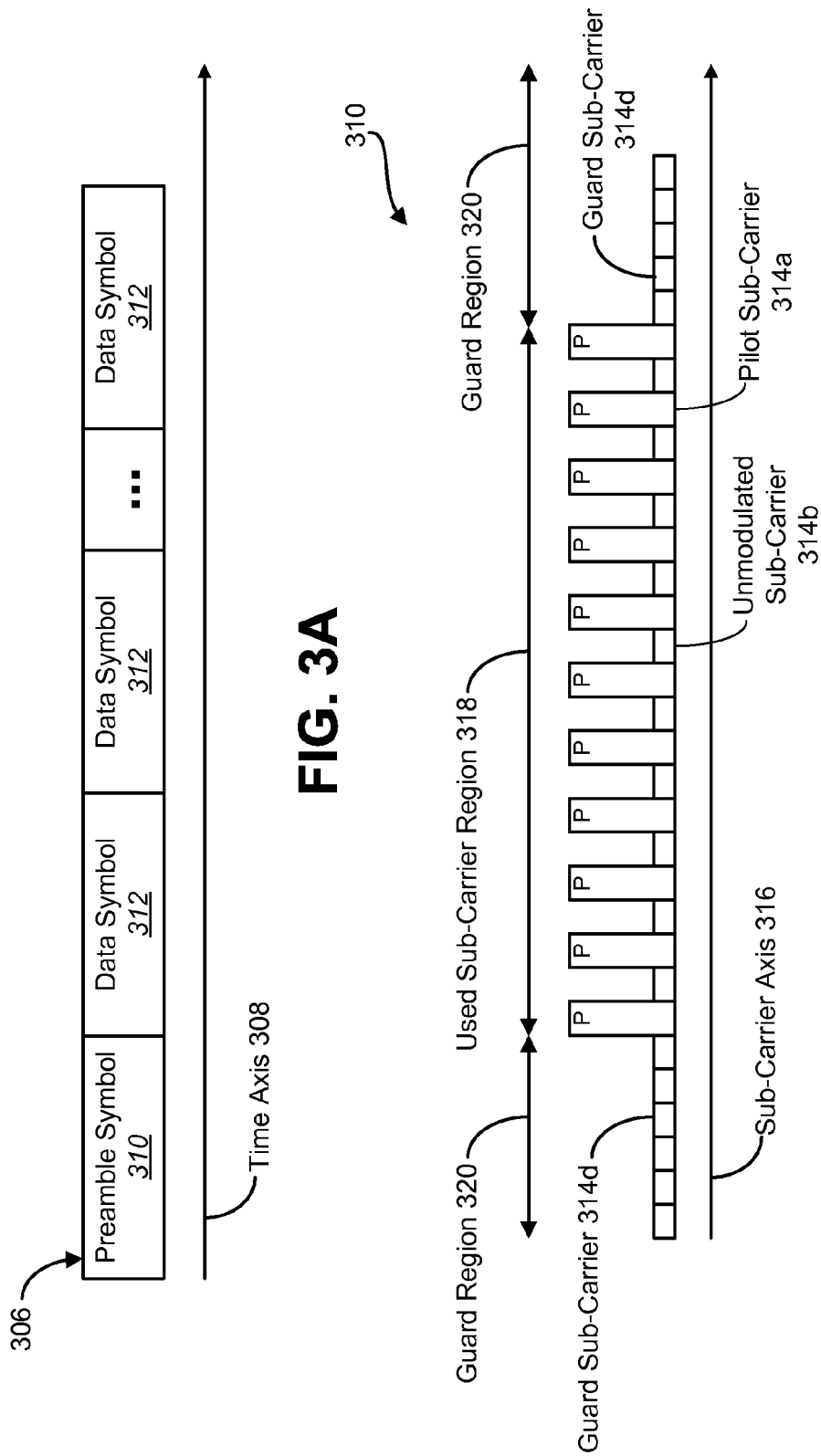

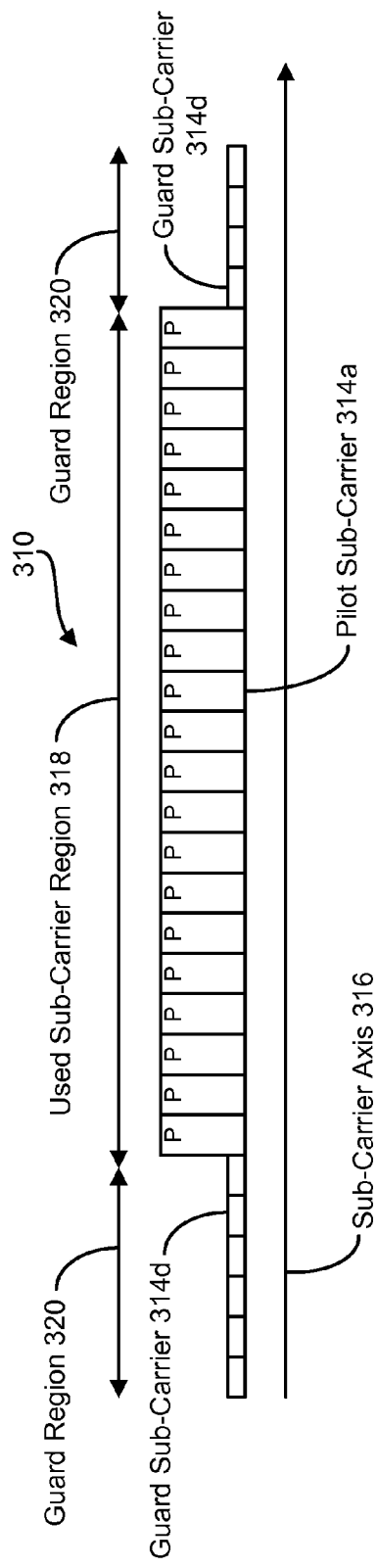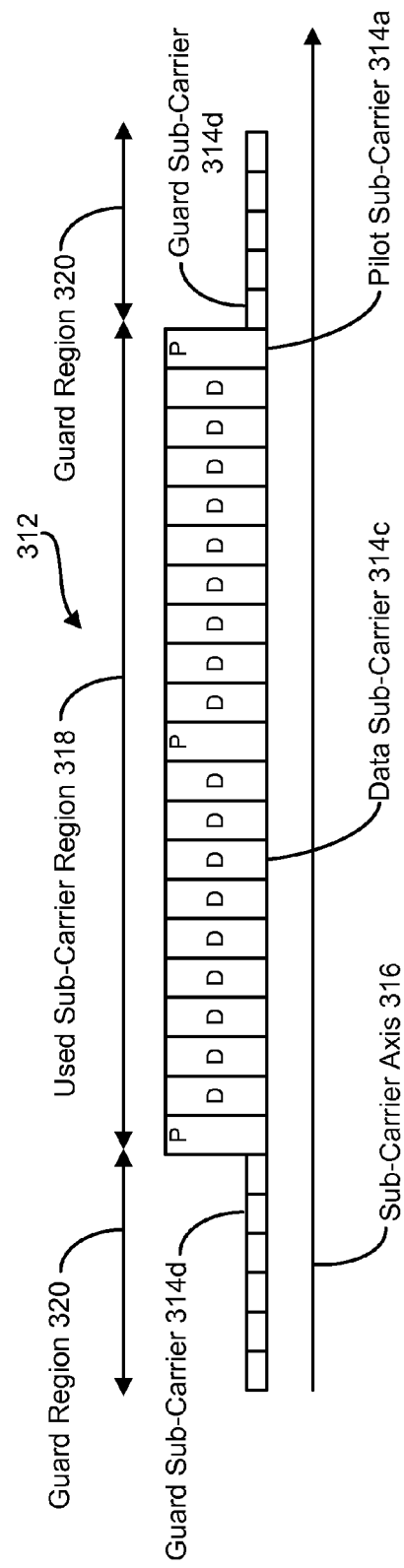
FIG. 3C
FIG. 3D

| Index | IDcell | Segment | Series to modulate (in hexadecimal format) |
|---|---|---|---|
| 0 | 0 | 0 | 0xA6F294537B285E1844677D133E4D53CCB1F182DE00489E53E6B6E77065C7EE7D0ADBEAF |
| 1 | 1 | 0 | 0x668321CBBE7F462E6C2A07E8BBDA2C7F7946D5F69E35AC8ACF7D64AB4A33C467001F3B2 |
| 2 | 2 | 0 | 0x1C75D30B2DF72CEC9117A0BD8EAF8E0502461FC07456AC906ADE03E9B5AB5E1D3F98C6E |
| 3 | 3 | 0 | 0x5F9A2E5CA7CC69A5227104FB1CC2262809F3B10D0542B9BDFDA4A73A7046096DF0E8D3D |

FIG. 5A

| Index | IDcell | Segment | Series to modulate (in hexadecimal format) |
|---|---|---|---|
| 0 | 0 | 0 | 0x66C9CB4D1C8F31D60F5795886EE02FFF6BE4 |
| 1 | 1 | 0 | 0xD8C30DA58B5ED71056C5D79032B80E05522C |
| 2 | 2 | 0 | 0x8EB62664E3B2C5222DE18E9000561F25AAFC |
| 3 | 3 | 0 | 0x3B32299087C257CD31C67E4AA5DD697B0E08 |

FIG. 5B

| Syntax | Size | Notes |
|---|---|---|
| DL_Frame_Prefix_Format() { | | |
| Used subchannel bitmap | 6 bits | Bit #0: Subchannels 0-11 are used<br>Bit #1: Subchannels 12-19 are used<br>Bit #2: Subchannels 20-31 are used<br>Bit #3: Subchannels 32-39 are used<br>Bit #4: Subchannels 40-51 are used<br>Bit #5: Subchannels 52-59 are used |
| reserved | 1 bit | Shall be set to zero |
| Repetition_Coding_Indication | 2 bits | 00 – No repetition coding on DL-MAP<br>01 – Repetition coding of 2 used on DL-MAP<br>10 – Repetition coding of 4 used on DL-MAP<br>11 – Repetition coding of 6 used on DL-MAP |
| Coding_Indication | 3 bits | 0b000 – CC encoding used on DL-MAP<br>0b001 – BTC encoding used on DL-MAP<br>0b010 – CTC encoding used on DL-MAP<br>0b011 – ZT CC used on DL-MAP<br>0b100 = CC encoding with optional interleaver<br>0b101 to 0b111 - Reserved |
| DL-Map_Length | 8 bits | |
| reserved | 4 bits | Shall be set to zero |
| } | | |

FIG. 7

METHODS AND APPARATUS FOR SYNCHRONIZATION AND DETECTION IN WIRELESS COMMUNICATION SYSTEMS

TECHNICAL FIELD

The present disclosure relates generally to wireless communication systems. More specifically, the present disclosure relates to methods and apparatus for synchronization and detection in wireless communication systems.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

As indicated above, the present disclosure relates generally to wireless communication systems. More specifically, the present disclosure relates to methods and apparatus for synchronization and detection in wireless communication systems.

BRIEF DESCRIPTION OF THE DRAWINGS

FIGS. 3A through 3D illustrate an example of a frame structure for a wireless communication system that utilizes OFDM/OFDMA;

FIGS. 5A and 5B illustrate examples of preamble sequences that may be defined for a wireless communication system that utilizes OFDM/OFDMA;

FIG. 7 illustrates an example of a downlink frame prefix;

SUMMARY

Figure 1:
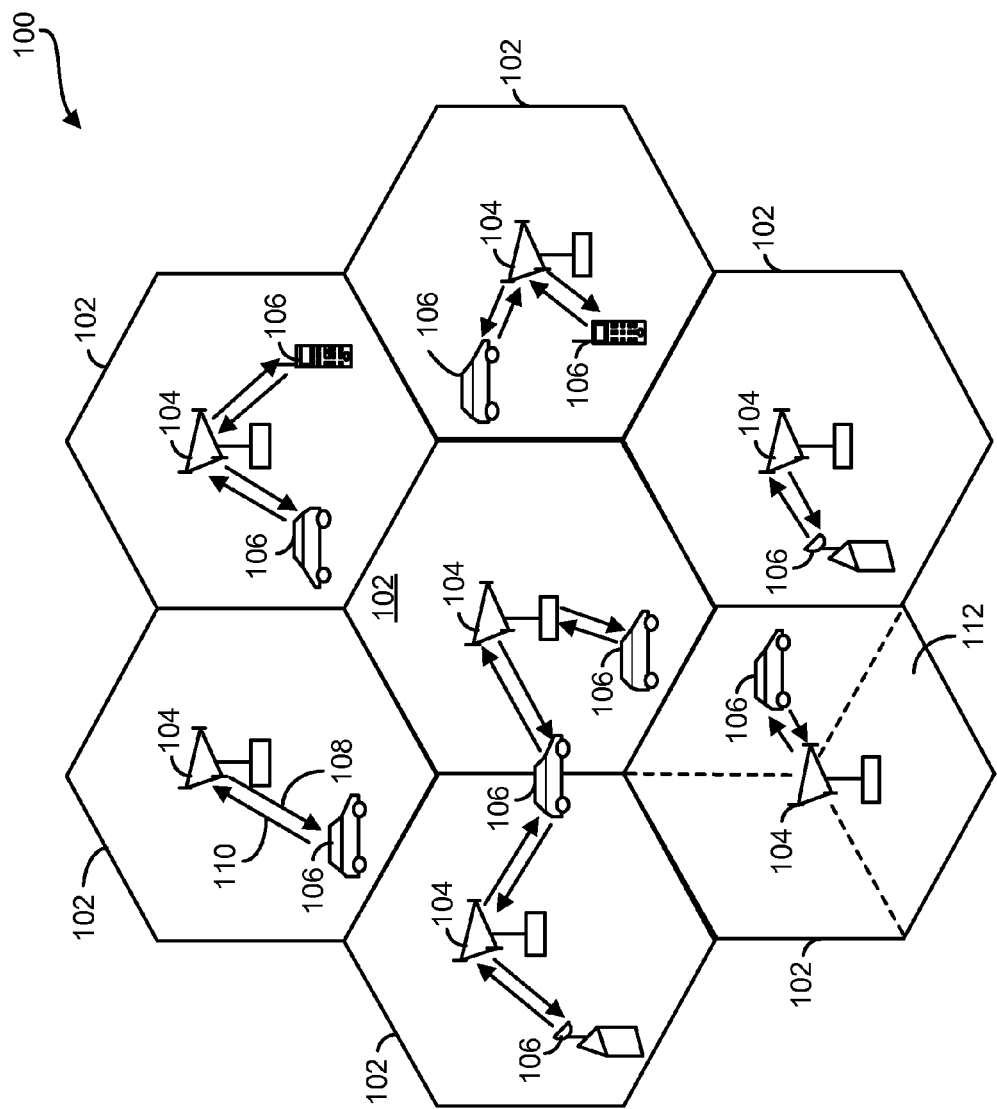
FIG. 1 illustrates an example of a wireless communication system.

A synchronization and detection method in a wireless device is disclosed. The method may include performing coarse detection and synchronization with respect to a received signal. The method may also include performing fine detection and synchronization for acquisition of the received signal. Results of the coarse detection and synchronization may be used for the fine detection and synchronization. The method may also include performing tracking mode processing when the acquisition of the received signal has been achieved.

A wireless device that performs synchronization and detection with respect to a received signal is also disclosed. The wireless device may include a coarse detection and synchronization component that performs coarse detection and synchronization with respect to a received signal. The wireless device may also include a fine detection and synchronization component that performs fine detection and synchronization for acquisition of the received signal. Results of the coarse detection and synchronization may be used for the fine detection and synchronization. The wireless device may also include a tracking mode processing component that performs tracking mode processing when the acquisition of the received signal has been achieved.

An apparatus that performs synchronization and detection with respect to a received signal is also disclosed. The apparatus may include means for performing coarse detection and synchronization with respect to a received signal. The apparatus may also include means for performing fine detection and synchronization for acquisition of the received signal. Results of the coarse detection and synchronization may be used for the fine detection and synchronization. The apparatus may also include means for performing tracking mode processing when the acquisition of the received signal has been achieved.

A computer-program product for performing synchronization and detection with respect to a received signal is also disclosed. The computer-program product may include a computer readable medium having instructions thereon. The instructions may include code for performing coarse detection and synchronization with respect to a received signal. The instructions may also include code for performing fine detection and synchronization for acquisition of the received signal. Results of the coarse detection and synchronization may be used for the fine detection and synchronization. The instructions may also include code for performing tracking mode processing when the acquisition of the received signal has been achieved.

DETAILED DESCRIPTION

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses. Mobile WiMAX offers the full mobility of cellular networks at broadband speeds.

Mobile WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate sub-streams. Each sub-stream is modulated with one of multiple orthogonal sub-carriers and sent over one of a plurality of parallel sub-channels. OFDMA is a multiple access technique in which users are assigned sub-carriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages like modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 October 2005" in October 2005 for mobile BWA systems. Those two standards defined four different physical layers (PHYs) and one medium access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system 100. The wireless communication system 100 provides communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 shows various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system 100.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within an OFDM/OFDMA system 100 may utilize antennas that concentrate the flow of power within a particular sector 112 of the cell 102. Such antennas may be referred to as directional antennas.

Figure 2:
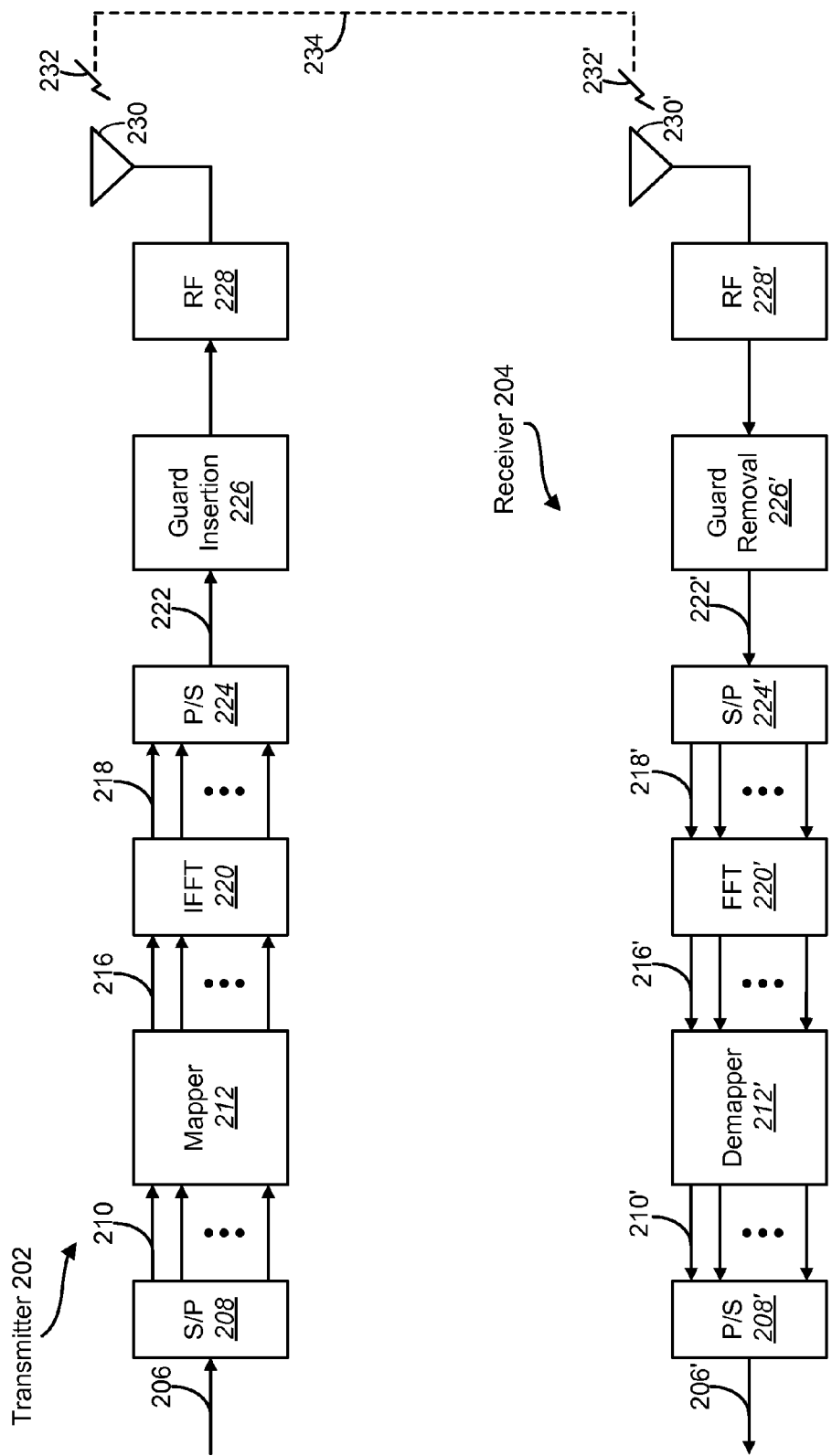
FIG. 2 illustrates an example of a transmitter and an example of a receiver that may be used within a wireless communication system that utilizes orthogonal frequency division multiplexing (OFDM) and orthogonal frequency divisional multiple access (OFDMA)

FIG. 2 illustrates an example of a transmitter 202 that may be used within a wireless communication system 100 that utilizes OFDM/OFDMA. The transmitter 202 may be implemented in a base station 104 for transmitting data 206 to a user terminal 106 on a downlink 108. The transmitter 202 may also be implemented in a user terminal 106 for transmitting data 206 to a base station 104 on an uplink 110.

Data 206 to be transmitted is shown being provided as input to a serial-to-parallel (S/P) converter 208. The S/P converter 208 splits the transmission data into N parallel data streams 210.

The N parallel data streams 210 may then be provided as input to a mapper 212. The mapper 212 maps the N parallel data streams 210 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 212 outputs N parallel symbol streams 216, each symbol stream 216 corresponding to one of the N orthogonal sub-carriers of the inverse fast Fourier transform (IFFT) 220. These N parallel symbol streams 216 are represented in the frequency domain, and may be converted into N parallel time domain sample streams 218 by an IFFT component 220.

A brief note about terminology will now be provided. N parallel modulations in the frequency domain are equal to N modulation symbols in the frequency domain, which are equal to N mapping plus N-point IFFT in the frequency domain, which is equal to one (useful) OFDM symbol in the time domain, which is equal to N samples in the time domain. One OFDM symbol in the time domain, Ns, is equal to $N_{cp}$ (the number of guard samples per OFDM symbol)+N (the number of useful samples per OFDM symbol).

The N parallel time domain sample streams 218 may be converted into an OFDM/OFDMA symbol stream 222 by a parallel-to-serial (P/S) converter 224. A guard insertion component 226 may insert a guard interval between successive OFDM/OFDMA symbols in the OFDM/OFDMA symbol stream 222. The output of the guard insertion component 226 may then be upconverted to a desired transmit frequency band by a radio frequency (RF) front end 228. An antenna 230 may then transmit the resulting signal 232.

FIG. 2 also illustrates an example of a receiver 204 that may be used within a wireless communication system 100 that utilizes OFDM/OFDMA. The receiver 204 may be implemented in a user terminal 106 for receiving data 232' from a base station 104 on a downlink 108. The receiver 204 may also be implemented in a base station 104 for receiving data 232' from a user terminal 106 on an uplink 110.

The transmitted signal 232 is shown traveling over a wireless channel 234. When a signal 232' is received by an antenna 230', the received signal 232' may be downconverted to a baseband signal by an RF front end 228'. A guard removal component 226' may then remove the guard interval that was inserted between OFDM/OFDMA symbols by the guard insertion component 226.

The output of the guard removal component 226' may be provided to an S/P converter 224'. The S/P converter 224' may divide the OFDM/OFDMA symbol stream 222' into the N parallel time-domain symbol streams 218', each of which corresponds to one of the N orthogonal sub-carriers. A fast Fourier transform (FFT) component 220' converts the N parallel time-domain symbol streams 218' into the frequency domain, and outputs N parallel frequency-domain symbol streams 216'.

A demapper 212' performs the inverse of the symbol mapping operation that was performed by the mapper 212, thereby outputting N parallel data streams 210'. A P/S converter 208' combines the N parallel data streams 210' into a single data stream 206'. Ideally, this data stream 206' corresponds to the data 206 that was provided as input to the transmitter 202.

FIG. 3A illustrates an example of a frame 306 that may be transmitted from a base station 104 to a user terminal 106 on a downlink 108 within a wireless communication system 100 that utilizes OFDM/OFDMA. The OFDM/OFDMA frame 306 is shown with respect to a time axis 308. The OFDM/OFDMA frame 306 is shown with one preamble symbol 310 and multiple data symbols 312. Although just one preamble symbol 310 is shown in FIG. 3A, an OFDM/OFDMA frame 306 may include multiple preamble symbols 310.

FIGS. 3B and 3C illustrate examples of frequency domain representations of a preamble symbol 310. These frequency domain representations are shown with respect to a sub-carrier axis 316. A used sub-carrier region 318 is shown. Two guard regions 320 are also shown.

In FIG. 3B, the used sub-carrier region 318 includes pilot sub-carriers 314a alternated with unmodulated sub-carriers 314b. In FIG. 3C, each sub-carrier 314 in the used sub-carrier region 318 is a pilot sub-carrier 314a.

FIG. 3D illustrates an example of a frequency domain representation of a data symbol 312. The data symbol 312 includes both data sub-carriers 314c and pilot sub-carriers 314a. A receiver 204 may perform channel estimation using pilot sub-carriers 314a of a preamble symbol 310 and/or pilot sub-carriers 314a of a data symbol 312.

The number of sub-carriers 314 within an OFDM/OFDMA system 100 may be equal to the number of FFT points. Within a wireless communication system 100 that utilizes OFDM/OFDMA, all available sub-carriers 314 may not be used. In particular, guard sub-carriers 314d in guard regions 320 may be excluded. In FIGS. 3B through 3D, guard sub-carriers 314d are shown around the lower and higher frequency bands. These guard sub-carriers 314d may not be allocated for data sub-carriers 314c or pilot sub-carriers 314a.

Figure 4:
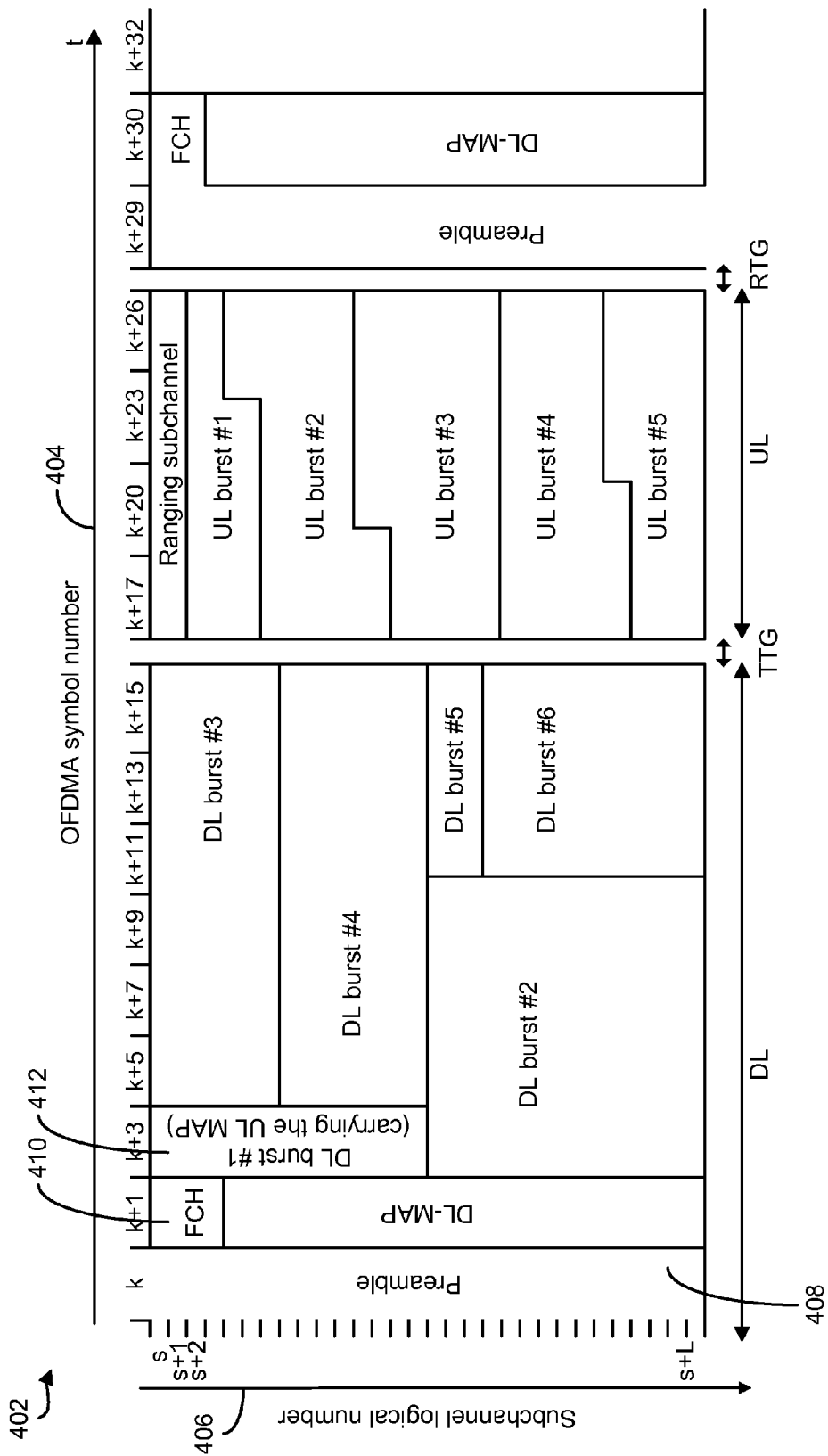
FIG. 4 illustrates an example of an OFDMA frame in time division duplex mode.

FIG. 4 illustrates an example of an OFDMA frame 402 (with only the mandatory zone) in time division duplex (TDD) mode. The x-axis 404 denotes the time axis or the OFDMA symbol axis, and the y-axis 406 denotes the frequency axis or the sub-channel axis. The first symbol of the frame 402 is the downlink preamble 408, and most of the timing reference is based on this preamble 408. The first channel of the downlink sub-frame is called the frame control header (FCH) 410, and the contents of the FCH 410 are called the downlink frame prefix (DLFP). The following bursts 412 of the FCH 410 may include mobile application part (MAP) messages, control messages, user bursts, etc.

The downlink radio signals from base stations 104 to user terminals 106 may include voice or data traffic signals or both. In addition, the base stations 104 generally transmit preambles 408 in their downlink radio signals to identify to the user terminals 106 the corresponding cells 102 and corresponding segments in the cells 102 to which the downlink radio signals are directed. Such a preamble 408 from a base station 104 allows a user terminal 106 to synchronize its receiver 204 in both time and frequency with the observed downlink signal and to acquire the identity of the base station 104 that transmits the downlink signal.

In a wireless communication system 100 that is configured in accordance with IEEE802.16e, there are three types of preamble carrier sets that may be defined. The preamble carrier sets may be defined by allocation of different sub-carriers 314, which may be modulated using a boosted BPSK modulation with a specific pseudo-noise (PN) code. The preamble carrier sets may be defined using the following formula:

$$PA_{cset}=s+3z \qquad (1)$$

In equation (1), the term $PA_{cset}$ represents all sub-carriers 314 allocated to the specific preamble 408 based on the useful sub-carrier index (i.e., an index that is assigned to the sub-carriers 314 in the used sub-carrier region 318). The term s represents the number of the preamble carrier set indexed 0 . . . 2 which corresponds to the segment of the sector 112. The term z represents a running index starting from 0 to M−1, where M is the length of the PN code. For example, M=284 at N=1024 FFT mode.

Each segment uses a preamble 408 corresponding to a carrier set out of the three available carrier sets in the following manner: segment 0 uses preamble carrier set 0, segment 1 uses preamble carrier set 1, and segment 2 uses preamble carrier set 2. (In the case of segment 0, the DC carrier is not modulated at all and the appropriate PN is discarded. Therefore, the DC carrier is zeroed. For the preamble symbol 408 there are 86 sub-carriers 314 in the guard regions 320 on the left side and the right side of the spectrum.) For a 1024 FFT size the PN series modulating the preamble carrier set is defined in the standard specification for an IEEE802.16e OFDM/OFDMA system.

FIGS. 5A and 5B illustrate examples of preamble sequences 506a, 506b that may be defined for a wireless communication system 100 that is configured in accordance with IEEE 802.16e. These preamble sequences 506a, 506b are defined in the standard specification for an IEEE 802.16e OFDM/OFDMA system.

The preamble sequences 506a shown in FIG. 5A correspond to an IEEE 802.16e OFDM/OFDMA system that uses 1024 sub-carriers. In the case of segment 0, the DC carrier may not be modulated at all and the appropriate PN may be discarded; therefore, the DC carrier may always be zeroed.

For the preamble symbol 408 there may be 86 sub-carriers 314 in the guard regions 320 on the left side and the right side of the spectrum.

The preamble sequences 506b shown in FIG. 5B correspond to an IEEE 802.16e OFDM/OFDMA system that uses 512 sub-carriers. In the case of segment 1, the DC carrier may not be modulated at all and the appropriate PN may be discarded; therefore, the DC carrier may always be zeroed. For the preamble symbol 408 there may be 42 sub-carriers 314 in the guard regions 320 on the left side and the right side of the spectrum.

Each preamble sequence 506a, 506b is associated with a segment 510a, 510b. Each preamble sequence 506a, 506b is also associated with a cell 102, which is identified by a cell identifier (IDcell) 512a, 512b. Each preamble sequence 506a, 506b is also associated with an index 516a, 516b, which may be referred to as a preamble index 516a, 516b.

The preamble sequence (PN series) 506 modulating the preamble carrier sets are defined in the standard specification for an IEEE 802.16e OFDM/OFDMA system. The preamble sequence 506 that is modulated depends on the segment 510 that is used and the IDcell parameter 512. The defined preamble sequence 506 may be mapped onto the preamble sub-carriers 314 in ascending order. The tables shown in FIGS. 5A and 5B include the preamble sequences 506 in a hexadecimal format. The value of the PN may be obtained by converting the series to a binary series (Wk) and mapping the PN from the most significant bit (MSB) of each symbol to the least significant bit (LSB). A "0" may be mapped to "+1," and a "1" may be mapped to "−1." For example, for index=0, segment=0, Wk=110000010010..., and the mapping maybe: −1 −1 +1 +1 +1 +1 +1 −1 +1 +1 −1 +1... A total of 114 PN series ($N_{pn}$=114) are defined in the standard specification, or 38 PN series for each segment ($N_{pnseg}$=38, $N_{seg}$=3).

Figure 6:
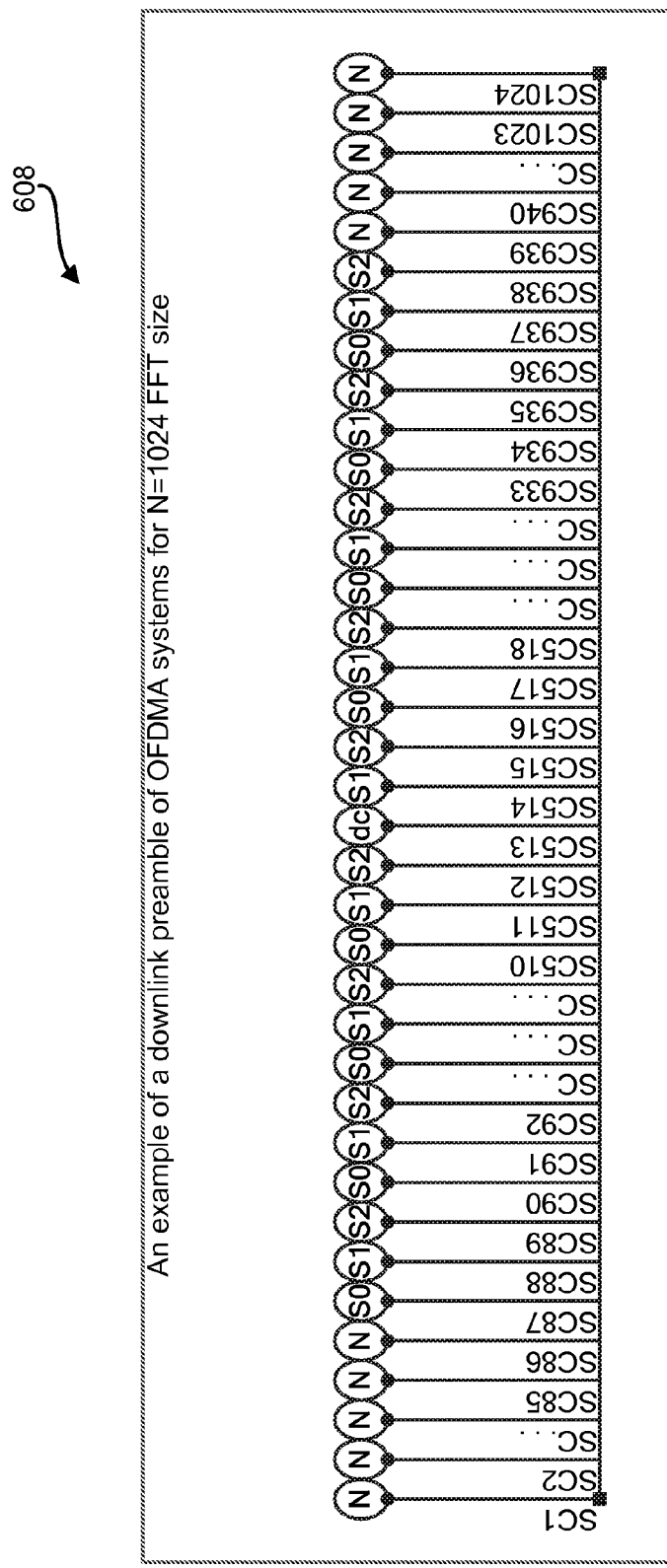
FIG. 6 shows an example of a frequency domain downlink preamble structure for a wireless communication system that utilizes OFDM/OFDMA.

FIG. 6 shows a frequency domain representation of a downlink preamble 608 for an IEEE802.16e OFDM/OFDMA system with an FFT size of 1024. In FIG. 6, N stands for a null sub-carrier 314, S0 stands for a sub-carrier 314 which belongs to segment 0, S1 stands for a sub-carrier 314 which belongs to segment 1, S2 stands for a sub-carrier 314 which belongs to segment 2, and dc stands for a DC sub-carrier 314. Because the FFT size is 1024, there are 1024 sub-carriers 314, and these sub-carriers 314 are numbered from SC1 to SC1024.

FIG. 7 illustrates a 24-bit downlink frame prefix (DLFP) 702. The frame control header (FCH) 410, which was discussed above, is an important channel (or burst) of an IEEE802.16d/e system. The contents of the FCH 410 are called the downlink frame prefix (DLFP) 702. The DLFP 702 is a data structure that is transmitted at the beginning of each frame 402. The DLFP 702 contains information regarding the current frame 402 and is mapped to the FCH 410. Successful decoding of the FCH/DLFP 410, 702 may be important to process the entire frame 402.

To decode downlink messages or bursts 412 sent by the base station 104, the user terminal 106 may perform the following functions before FCH decoding: automatic gain control (AGC), downlink signal detection, downlink preamble detection, frequency synchronization (fractional and integer), OFDM symbol timing detection, segment detection, and preamble sequence detection.

The present disclosure relates generally to a synchronization and detection architecture for a wireless communication system 100 that utilizes OFDM/OFDMA. The proposed scheme may include three major steps. The first step may include coarse detection and synchronization processes, which may include coarse signal detection, coarse preamble detection, coarse symbol timing detection, and fractional frequency offset estimation. The second step may include fine detection and synchronization processes, which may include verification of signal detection, verification of preamble detection, and fine symbol timing detection. The third step may include preamble sequence identification and integer frequency offset estimation processes, which may include preamble sequence identification, integer frequency offset estimation, segment extraction, and sampling frequency offset estimation. An automatic gain control (AGC) process may also be included as one of the synchronization processes, and a physical layer (PHY) synchronization process may also be included for acquiring the downlink PHY synchronization that is the final stage of PHY level synchronization. In addition, the present disclosure also includes a scheme for searching neighbor cells for purposes of handover.

Figure 8:
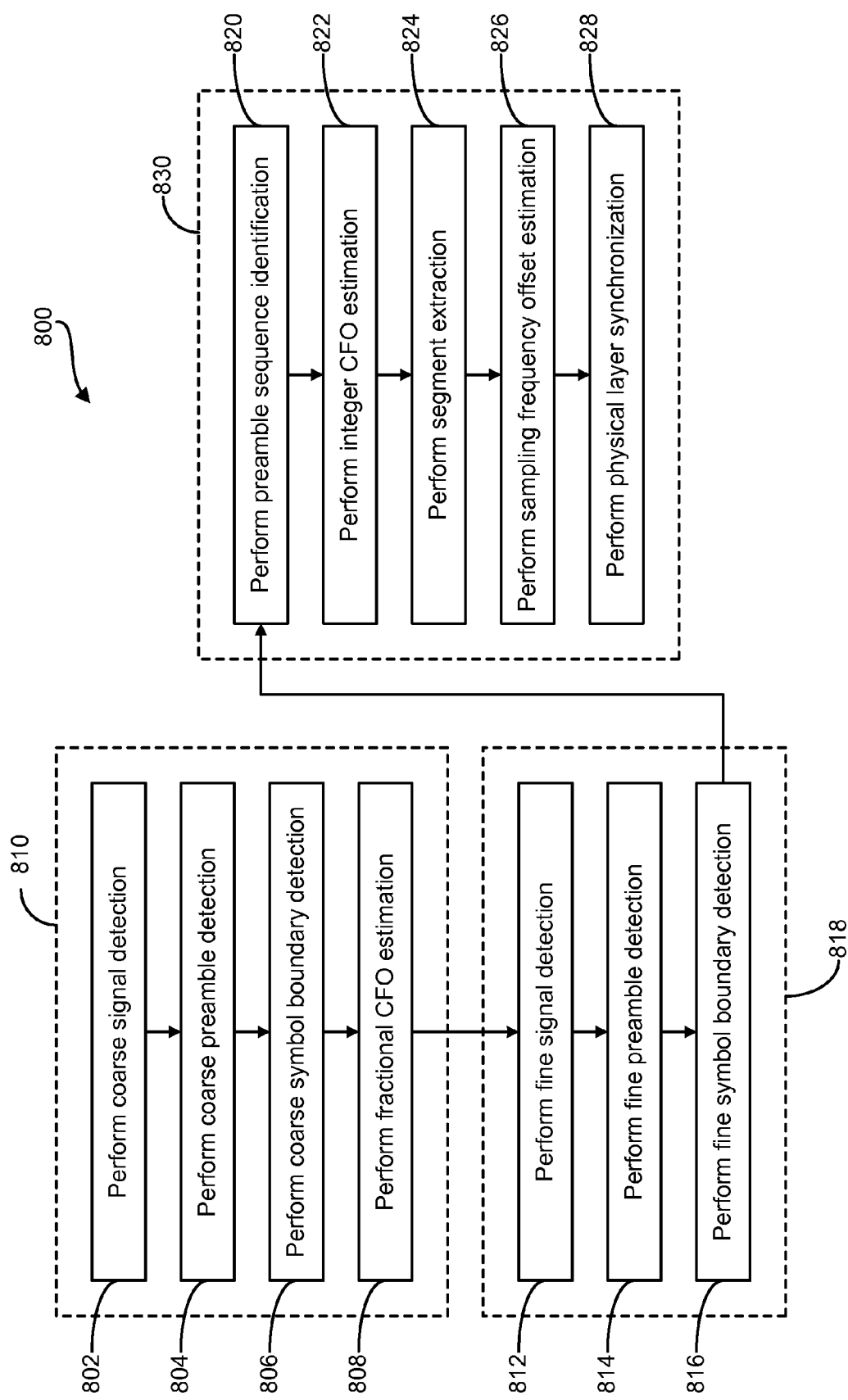
FIG. 8 illustrates an example of a synchronization and detection method that may be performed by a wireless device in a wireless communication system that utilizes OFDM/OFDMA.

FIG. 8 illustrates an example of a synchronization and detection method 800 that may be performed by a wireless device (e.g., a user terminal 106) in a wireless communication system 100 that utilizes OFDM/OFDMA.

The method 800 may include performing 802 coarse signal detection with respect to a received signal, performing 804 coarse preamble detection with respect to the received signal, performing 806 coarse symbol boundary detection with respect to the received signal, and performing 808 fractional carrier frequency offset (CFO) estimation with respect to the received signal. Collectively, these steps 802, 804, 806, 808 may be referred to as performing 810 coarse detection and synchronization with respect to a received signal.

The method 800 may also include performing 812 fine signal detection with respect to the received signal, performing 814 fine preamble detection with respect to the received signal, and performing 816 fine symbol boundary detection with respect to the received signal. Collectively, these steps 812, 814, 816 may be referred to as performing 818 fine detection and synchronization for acquisition of the received signal.

The results that are determined from performing 810 the coarse detection and synchronization may be used for performing 818 the fine detection and synchronization. For example, performing 812 fine signal detection may include verifying the result that was obtained by performing 802 coarse signal detection. Similarly, performing 814 fine preamble detection may include verifying the result that was obtained by performing 804 coarse preamble detection.

When the acquisition of the received signal has been completed, tracking mode may be entered. In particular, the method 800 may then include performing 820 preamble sequence identification, performing 822 integer carrier frequency offset (CFO) estimation, performing 824 segment estimation, performing 826 sampling frequency offset (SFO) estimation, and performing 828 physical layer synchronization. Collectively, these steps 820, 822, 824, 826, 828 may be referred to as performing 830 tracking mode processing.

Figure 8A:
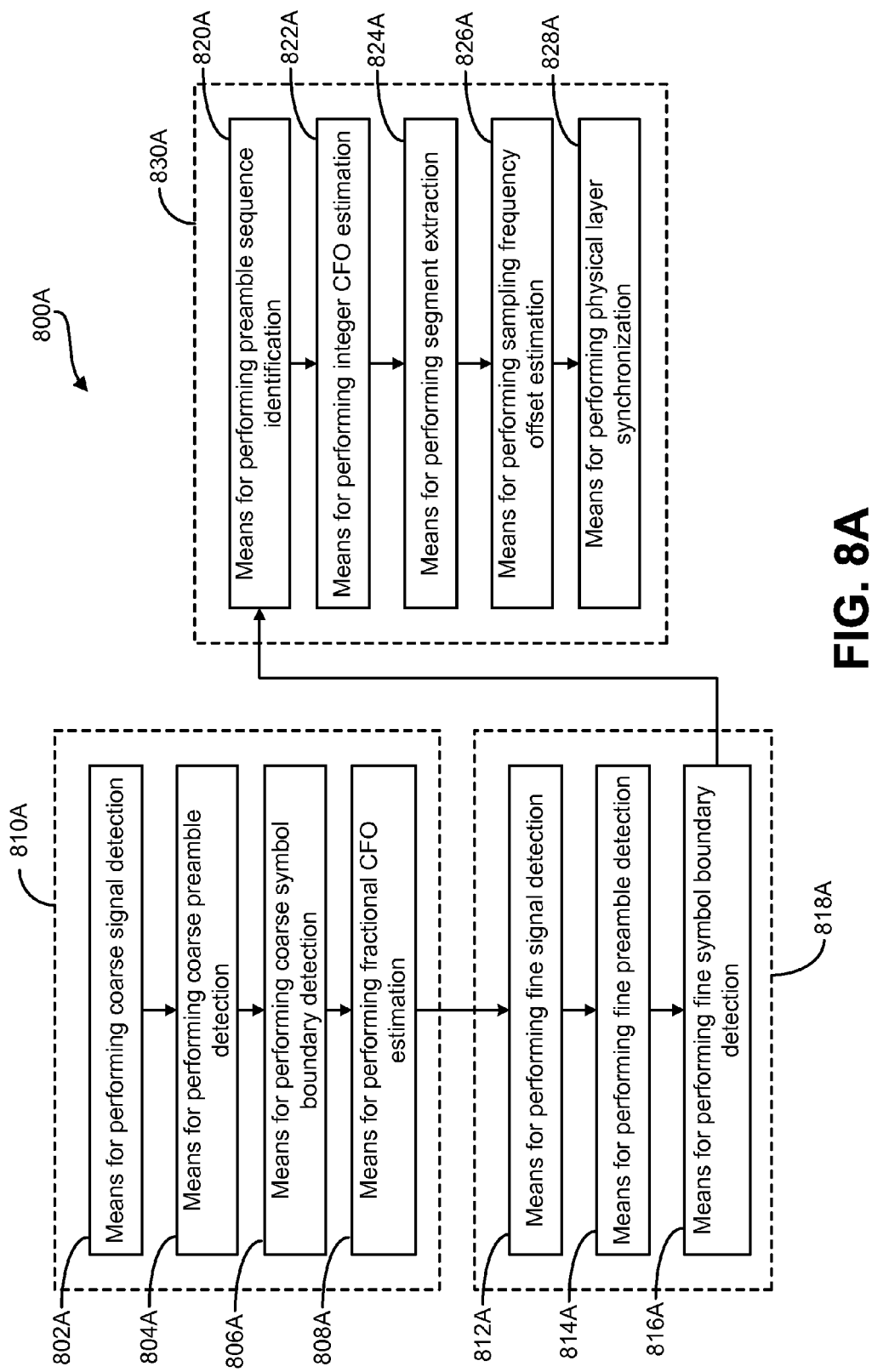
FIG. 8A illustrates means-plus-function blocks corresponding to the method shown in FIG. 8.

The method 800 of FIG. 8 described above may be performed by various hardware and/or software component(s) and/or module(s) corresponding to the means-plus-function blocks 800A illustrated in FIG. 8A. In other words, blocks 802 through 828 illustrated in FIG. 8 correspond to means-plus-function blocks 802A through 828A illustrated in FIG. 8A.

Figure 9:
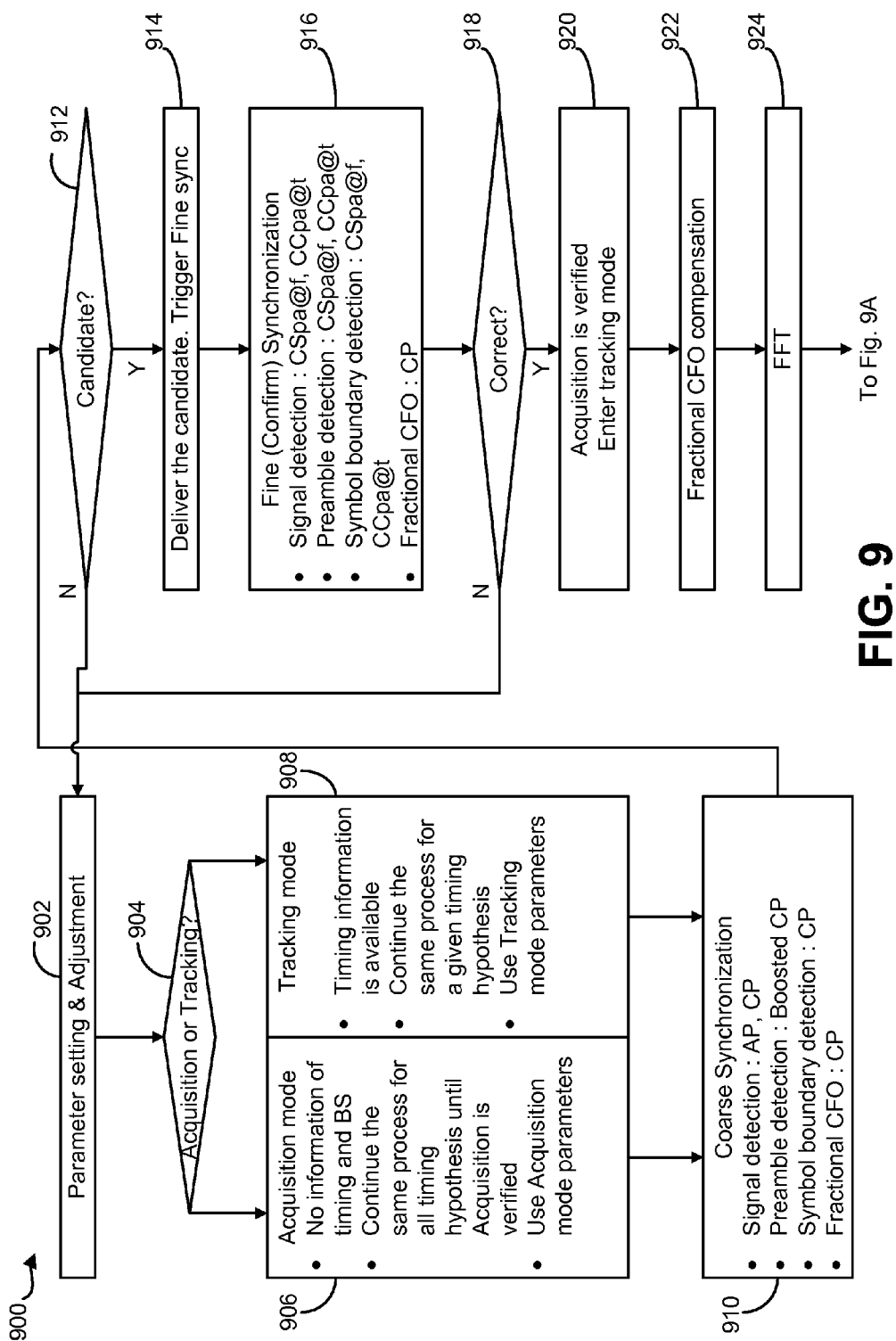
FIGS. 9 and 9A illustrate another example of a synchronization and detection method that may be performed by a wireless device in a wireless communication system that utilizes OFDM/OFDMA.
Figure 9A:
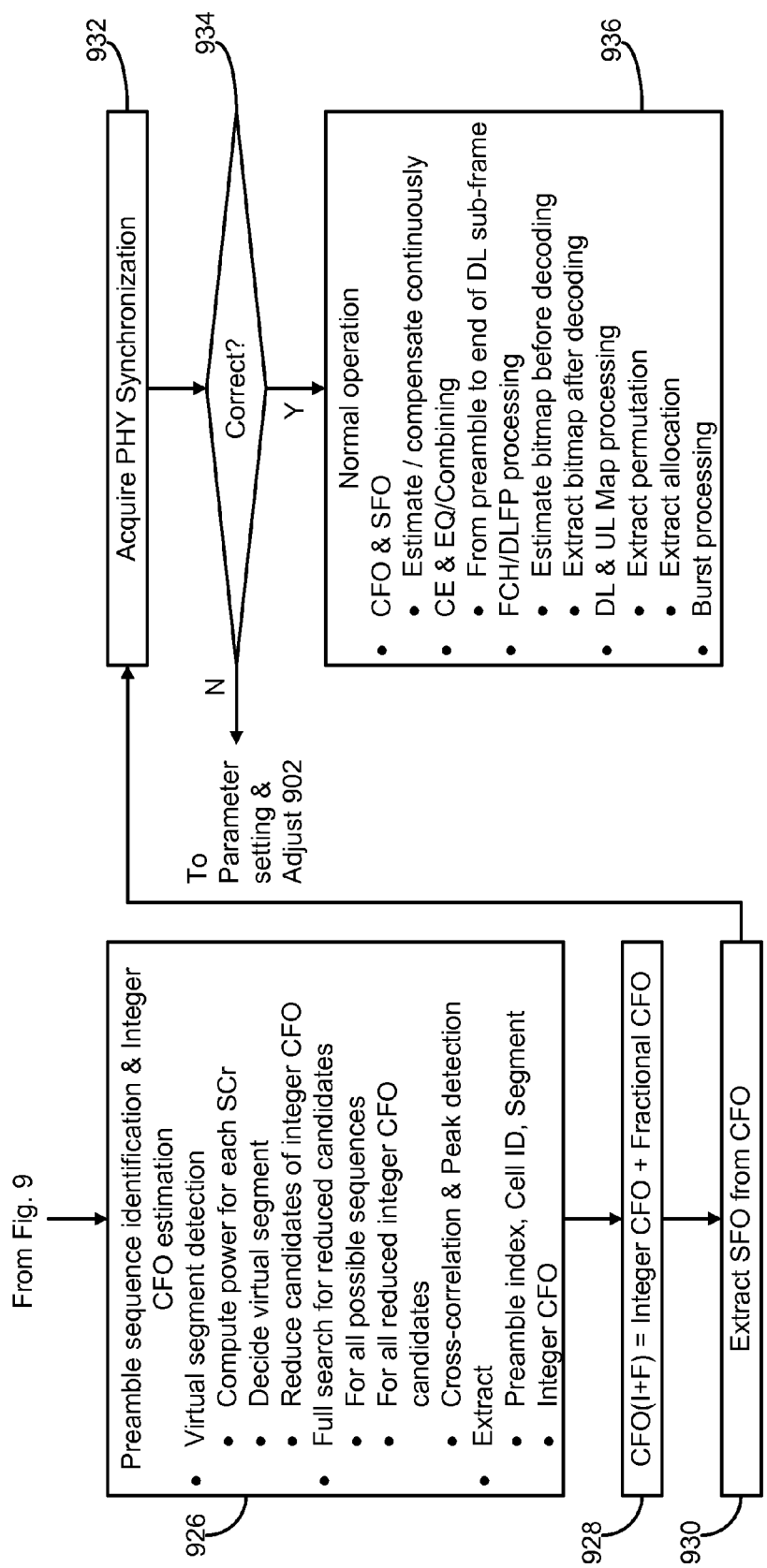

FIGS. 9 and 9A illustrate an example of a synchronization and detection method 900 that may be performed by a wireless device (e.g., a user terminal 106) in a wireless communication system 100 that utilizes OFDM/OFDMA. This method 900 is an example of a possible implementation of the synchronization and detection method 800 that is shown in FIG. 8.

The method 900 includes performing 902 parameter setting and adjustment. This may include setting bandwidth, setting frame duration, setting fast Fourier transform (FFT) size, setting Gr, setting automatic gain control (AGC), setting and starting timers, setting acquisition mode parameters, setting tracking mode parameters, setting physical layer synchronized mode parameters, etc. The term Gr refers to guard ratio, which is one of 1/32, 1/16, 1/8, and 1/4 of a useful OFDMA symbol.

The method 900 also includes entering 904 acquisition mode 906 or tracking mode 908. In acquisition mode 906, timing information and base station information may not be available. Some parameters like threshold(s), timing, preamble sequence 506, and frequency offset may be set based on acquisition mode parameter control. In acquisition mode 906, detectors and synchronizers may continue the same processes as previous operations for all possible timing hypotheses until acquisition is verified.

In tracking mode 908, some timing and frequency information may be available, so that information may be used in subsequent processes. Some parameters like threshold(s), timing, preamble sequence 506, and frequency offset may be set based on tracking mode parameter control. Those parameters may be fine tuned over time. In tracking mode 908, detectors and synchronizers may continue the same processes by updating synchronization and detection parameters to the values obtained during fine synchronization and detection. The timing hypotheses may be narrowed more and more to a given range over time.

The method 900 also includes performing 910 coarse detection and synchronization. As indicated above, coarse detection and synchronization may include coarse signal detection, coarse preamble detection, coarse symbol boundary detection, and fractional CFO estimation.

Once an incoming signal is recognized 912 as a candidate, then the candidate may be delivered 914 to the appropriate component(s) for fine detection and synchronization with related information like timing and frequency offset. For purposes of performing 910 coarse detection and synchronization, the incoming signal may be processed on a symbol-by-symbol basis, thereby providing real-time processing capability. In one implementation, every incoming OFDMA symbol may be considered 912 to be a candidate, and all the candidates may be delivered 914 to the appropriate component(s) for fine detection and synchronization.

Certain information may be determined as part of performing 910 coarse detection and synchronization. For example, the average power of the received signal may be determined. This may be referred to herein as AP. As another example, the auto-correlation of the received signal using the cyclic prefix (CP) property of the preamble may be determined. This may be referred to herein as CORRcp. Both AP and CORRcp may be determined on a continuous basis. CORRcp may be determined in the time domain.

As indicated above, performing 910 coarse detection and synchronization may include performing coarse signal detection. Both AP and CORRcp may be used as part of a threshold detection scheme for purposes of coarse signal detection. For example, the measured AP and CORRcp values may be compared to predetermined thresholds for purposes of coarse signal detection.

As indicated above, performing 910 coarse detection and synchronization may include performing coarse preamble detection. Both AP and CORRcp may be used as part of a threshold detection scheme for purposes of coarse preamble detection. For example, the measured AP and CORRcp values may be compared to predetermined thresholds for purposes of coarse preamble detection. Also, because the power may be increased (e.g., by about 4.26 dB) for transmission of the preamble 408, this may also be taken into consideration for purposes of coarse preamble detection.

All possible preamble candidates may be delivered 914 to the appropriate component(s) for purposes of fine detection and synchronization. This may be done on a continuous basis.

As indicated above, performing 910 coarse detection and synchronization may include performing coarse symbol boundary detection. Both AP and CORRcp may be used as part of a threshold detection scheme for purposes of coarse symbol boundary detection. For example, the measured AP and CORRcp values may be compared to predetermined thresholds for purposes of coarse symbol boundary detection. Coarse symbol boundary detection may include determining a possible range for an initial timing hypothesis. This initial timing hypothesis may be referred to herein as $n_0$. This range may be delivered 914 to the appropriate component(s) for purposes of fine detection and synchronization.

A brief explanation will now be provided about how the thresholds for coarse signal detection, coarse preamble detection, and coarse symbol boundary detection are determined. The cyclic prefix correlation metric may be expressed as:

$$CORR_{cp}(m) = \left| \sum_{k=m}^{m+N_g-1} r(k) r*(k+N) \right| \qquad (2)$$

The average power metric may be expressed as:

$$AP(m) = \sum_{k=m}^{m+N_g-1} |r(k+N)|^2 \qquad (3)$$

For coarse signal detection, the following tests may be used with some state machine:

$$\begin{cases} \text{Hit} = 1 & \text{if } CORR_{cp}(m) >= F_{sig\,det} \times AP(m) \\ \text{Hit} = 0 & \text{otherwise} \end{cases} \qquad (4)$$

and/or $$\begin{cases} \text{Hit} = 1 & \text{if } AP(m) >= F_{sig\,det\,bgn} \times AP_{bgn} \\ \text{Hit} = 0 & \text{otherwise} \end{cases} \qquad (5)$$

For coarse preamble detection, the following tests may be used with some stat machine:

$$\begin{cases} \text{Hit} = 1 & \text{if } CORR_{cp}(m) >= F_{pa\,det} \times AP(m) \\ \text{Hit} = 0 & \text{otherwise} \end{cases} \qquad (6)$$

For coarse symbol boundary detection, the following maximum likelihood test may be used:

$$n_0 = \underset{m}{\mathrm{argmax}}(CORR_{cp}(m)) \qquad (7)$$

$F_{sig\,det}$ and $F_{pa\,det}$ are factors for signal detection, preamble detection and coarse symbol boundary detection, respectively. $F_{sig\,det\,bgn}$ and $AP_{bgn}$ are factors for signal detection and average background noise level, respectively.

As indicated above, performing 910 coarse detection and synchronization may include performing fractional carrier frequency offset (CFO) estimation. CORRcp may be used for purposes of fractional CFO estimation. An example of an estimation range that may be used is −0.5 to +0.5. The fractional CFO estimate that is determined may be delivered 914 to the appropriate component(s) for purposes of fractional CFO compensation if tracking mode 908 is activated.

The method 900 also includes performing 916 fine detection and synchronization. In general terms, fine detection and synchronization may be thought of as verifying some or all of the results of coarse detection and synchronization. As indicated above, fine detection and synchronization may include fine signal detection, fine preamble detection, and fine symbol boundary detection.

One goal of fine detection and synchronization may be to recognize 918 an incoming candidate desired signal. Once this occurs, then it may be determined that acquisition is complete, and tracking mode 908 may be entered 920.

When fine synchronization is performed 916, all candidates that are determined as a result of performing 910 coarse synchronization may be processed. Incoming candidates may be processed on a symbol-by-symbol basis. All fine detection and synchronization may be done within one symbol to provide a real-time processing capability.

Fine detection and synchronization may be performed regardless of whether the preamble 408 is known or unknown. The following discussion of fine detection and synchronization may be applicable during acquisition mode 906, during tracking mode 908, or during normal operation.

Certain information may be determined as part of performing 916 fine detection and synchronization. For example, the average power of the received signal may be determined. As indicated above, the average power may be referred to herein as AP. As another example, the auto-correlation of delivered candidate preamble signal(s) using the conjugate symmetric (CS) property of the preamble 408 may be determined. This may be referred to herein as CORRcs. AP and CORRcs may be determined continuously for all delivered candidates.

A brief description will now be provided regarding how the CORRcs may be determined. A candidate preamble signal and the timing hypothesis $n_0$ may be received. The FFT may be applied for each half of the preamble 408. The symbol boundary may be referenced by the timing hypothesis $n_0$. The convolution function may be provided by dot-multiplying each corresponding sub-carrier 314 in the frequency domain. The IFFT may then be applied to the result. CORRcs may be determined in the time domain or in the frequency domain.

As indicated above, performing 916 fine detection and synchronization may include performing fine signal detection. Both AP and CORRcs may be used as part of a threshold detection scheme for purposes of fine signal detection. For example, the measured AP and CORRcp values may be compared to predetermined thresholds for purposes of fine signal detection.

As indicated above, performing 916 fine detection and synchronization may include performing fine preamble detection. Both AP and CORRcs may be used as part of a peak detection and/or a threshold detection scheme for purposes of fine preamble detection. For example, the measured AP and CORRcs values may be compared to predetermined thresholds for purposes of fine preamble detection.

The result of the fine preamble detection may be used for purposes of performing fine signal detection. For fine symbol boundary detection, peak detection may be used. This may be expressed as:

$$FineSymBoundry\ z_{fsb} = \underset{n}{\operatorname{argmax}}(CORR_{cs}(n)) \qquad (8)$$

The term $z_{fsb}$ is the position of the fine symbol boundary. For fine signal detection, threshold detection may be used. In particular, $CORR_{cs}(z_{fsb})$ and AP may be compared. This may be expressed as:

$$FineSigDet = \begin{cases} 1 & \text{if } CORR_{cs}(z_{fsb}) \geq F_{fsig\ det} \times AP \\ 0 & \text{otherwise} \end{cases} \qquad (9)$$

The term $F_{fsig\ det}$ is a factor for fine signal detection. If the fine signal detection passes the criteria, it may be determined that the coarse signal detection has been verified, the signal has been detected, and that the fine symbol boundary $z_{fsb}$ is valid and final. The method 900 may then proceed to the next stage (i.e., processing the preamble sequence identification). If the fine signal detection fails the criteria, it may be determined that the coarse signal detection was wrong and that the signal has not been detected yet. Then, the coarse synchronization processes may be redone.

As indicated above, performing 916 fine detection and synchronization may include performing fine symbol boundary detection. Both AP and CORRcs may be used as part of a peak detection scheme for purposes of fine symbol boundary detection. The fine symbol boundary (timing) may be determined using the result of the peak detection and the initial timing hypothesis $n_0$ that was determined as part of coarse detection and synchronization.

As discussed above, fractional CFO estimation may be performed as part of coarse detection and synchronization. Fractional CFO estimation may also be performed as part of fine detection and synchronization. As discussed above, CORRcp may be used for purposes of fractional CFO estimation, depending on and based on the results of fine signal detection, fine preamble detection, and fine symbol boundary detection. An example of an estimation range that may be used is −0.5 to +0.5.

Next, fine detection and synchronization will be discussed assuming that the preamble 408 is known. This may be the case after acquisition has been completed (i.e., after tracking mode 908 has been entered), or during normal operation. This case may be applicable for searching neighbor cells.

If the preamble 408 is known, performing 916 fine detection and synchronization may also include determining the cross-correlation of the preamble 408 with respect to a reference preamble. This may be referred to herein as CORRref. CORRref may be determined only once per frame.

If the preamble 408 is known and CORRref is determined, CORRref may be used for purposes of fine preamble detection and fine symbol boundary detection. The results of the fine preamble detection and the fine symbol boundary detection may be listed on candidate neighbor lists.

The method 900 may also include performing 922 fractional carrier frequency offset (CFO) compensation. This may be done after entering tracking mode 908, i.e., fractional CFO compensation may not be available in acquisition mode 906. Fractional CFO compensation may be applied for all incoming signals. Fractional CFO compensation may be realized only in the baseband signal, only in the RF signal, or in both the baseband signal and the RF signal. Fractional CFO compensation may be performed in the time domain.

The method 900 may also include performing 924 a fast Fourier transform (FFT) for all incoming signals that are processed in the frequency domain. If the FFT is performed before acquiring physical layer synchronization, it may be sufficient to apply the FFT to only the candidate preamble signal. Different FFT modes may be supported (e.g., 1024 mode, 512 mode). The resulting signal (after the FFT is performed 924) may be saved in a signal buffer.

Referring now to FIG. 9A, the method 900 may also include performing 926 preamble sequence identification and integer carrier frequency offset (CFO) estimation. A two-step approach may be used to reduce the search time during preamble sequence identification and integer CFO estimation. The first step may include reducing possible integer CFO candidates. The second step may include searching for all possible candidates of preamble sequences 506, for the reduced set of integer CFO candidates. All searching operations for preamble sequence identification and integer CFO estimation may be done within one frame in order to provide real-time processing.

As part of performing 926 preamble sequence identification and integer CFO estimation, certain information may be determined. For example, the power of each sub-carrier 314 may be determined. In addition, the cross-correlation between the received signal and possible preamble sequences 506 may also be determined. This may be referred to herein as CORRps.

Performing 926 preamble sequence identification and integer CFO estimation may also include making a decision about a virtual segment. This decision may be made using the measured power of each sub-carrier 314. The power sum of each virtual segment (Pv0, Pv1, Pv2) may be computed. Peak detection may be used to decide on the virtual segment. The candidates of the integer CFO may be reduced based on the virtual segment. The candidates may be reduced by one-third, for example.

As indicated above, CORRps may be determined as part of performing 926 preamble sequence identification and integer CFO estimation. This may be done before acquiring physical layer synchronization. In this case, CORRps may be computed for all possible preamble sequences (e.g., 114 sequences where the FFT mode is 1024). Alternatively, CORRps may be determined after acquiring physical layer synchronization or during a cell search process.

CORRps may be determined for all integer CFO candidates within the reduced set of integer CFO candidates. This may be done either before or after acquiring physical layer synchronization. There may be Zi/3 integer CFO candidates per preamble sequence 506, where Zi is the maximum allowable integer CFO value.

Performing 926 preamble sequence identification and integer CFO estimation may be done using peak detection for all the results of CORRps. The PAindex 516 and the cell ID 512 may be determined. In addition, the segment 510 may be determined. In addition, the integer CFO may be determined.

The method 900 may also include performing 928 overall CFO estimation and compensation. The overall CFO estimate may include both the fractional CFO estimate and the integer CFO estimate. Overall CFO compensation may be performed based on the estimated overall CFO. Overall CFO compensation may be realized only in the baseband signal, only in the RF signal, or both in the baseband signal and the RF signal. Overall CFO compensation may be performed in the time domain.

The method 900 may also include performing 930 sampling frequency offset (SFO) estimation and compensation. The SFO may be extracted from the estimated CFO. As an example, in mobile WiMAX a locked clock scheme may be used for SFO estimation. SFO compensation may be performed using the estimated SFO. SFO compensation may be realized only in the baseband signal, only in the RF signal, or both in the baseband signal and the RF signal. SFO compensation may be performed in the time domain.

The method 900 may also include acquiring 932 physical layer synchronization. This may include determining whether all hypotheses are correct or not. An attempt may be made to receive downlink messages including FCH/DLFP, MAP messages, Device Capability Discovery (DCD) messages, Uniform Call Distribution (UCD) messages, and so forth. It may be determined 934 that physical layer synchronization has been established if received messages look like downlink messages by checking the cyclic redundancy check (CRC) or the message rules of the downlink 108.

If after investigating downlink messages (which may be done for several frames repeatedly) it is determined 934 that physical layer synchronization is not established, then the method 900 may include going back to acquisition mode 906 and retrying the entire synchronization process again. In particular, the wireless device may be set to acquisition mode 906, parameters may be set 902 for acquisition mode 906, and the method 900 may continue in the manner described above.

If after investigating downlink messages it is determined 934 that physical layer synchronization is established (e.g., if downlink messages are received successfully), then the method 900 may include entering 936 normal operation. In particular, the wireless device may be set to physical layer synchronization mode, and parameters may be set for physical layer synchronization.

Normal operation 936 may include estimating and compensating for CFO/SFO continuously. Normal operation 936 may also include performing channel estimation and equalization from the preamble 408 to the end of the downlink sub-frame.

Normal operation 936 may also include FCH/DLFP processing. This may include estimating the sub-channel bitmap before decoding the FCH/DLFP. This may also include extracting the zone boosting factor and available pilots from the estimated sub-channel bitmap. The FCH/DLFP may be decoded, and the sub-channel bitmap may be extracted from the decoded DLFP. The zone boosting factor and available pilots may be extracted from the sub-channel bitmap. Normal operation may also include downlink 108/uplink 110 map processing, burst processing, acquiring all necessary downlink parameters from the base station 104, entering a ranging process, and so forth.

Coarse detection and synchronization and fine detection and synchronization may be performed serially. In other words, the coarse detection and synchronization may be performed first, and then the fine detection and synchronization may be performed when the results of the coarse detection and synchronization are available.

Alternatively, coarse detection and synchronization and fine detection and synchronization may be performed concurrently. In other words, the coarse detection and synchronization and the fine detection and synchronization may begin at about the same time. Initially, the fine detection and synchronization may be performed without any results from the coarse detection and synchronization. When results from the coarse detection and synchronization are available, these results may be used for purposes of the fine detection and synchronization.

Figure 10:
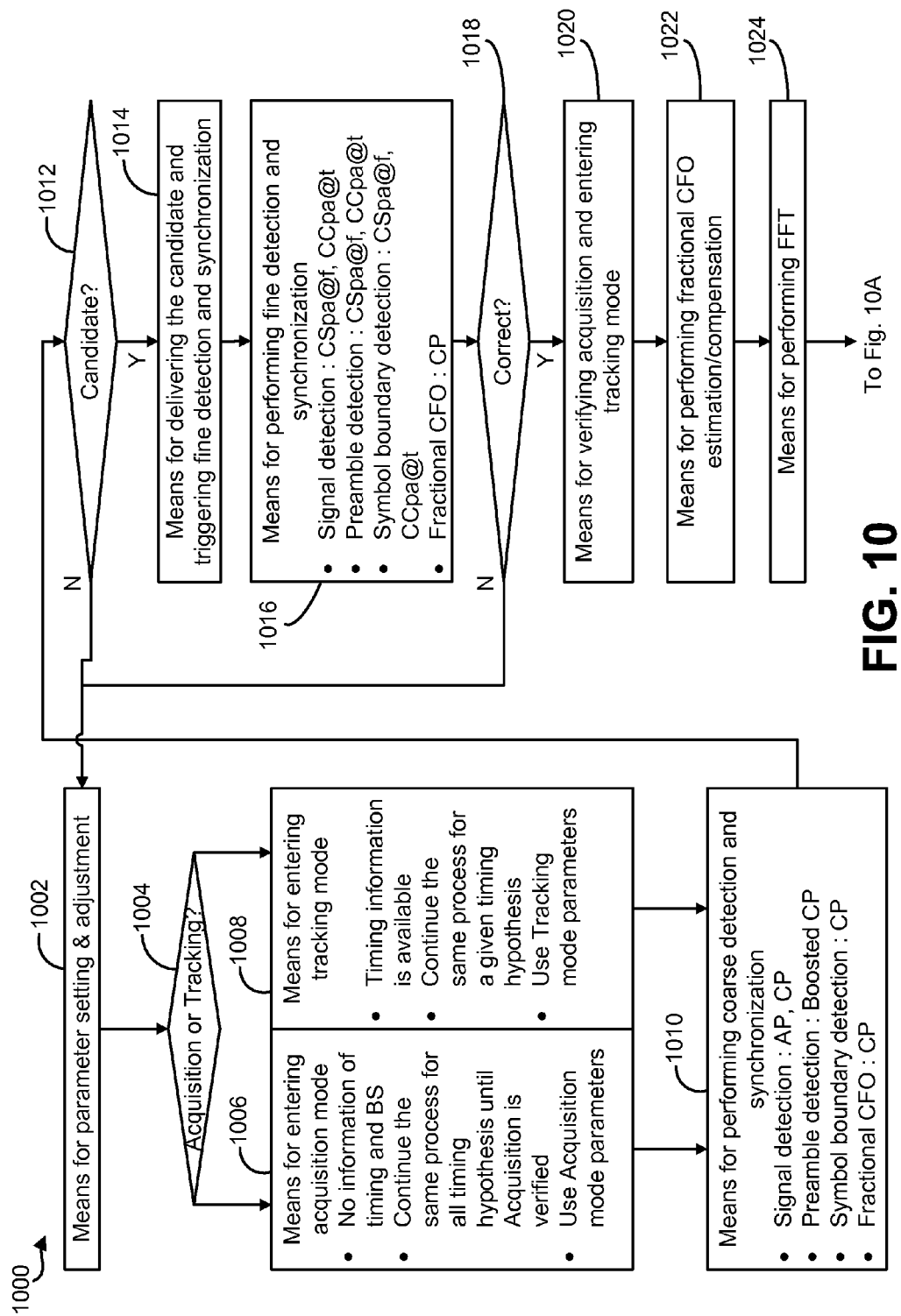
FIGS. 10 and 10A illustrate means-plus-function blocks corresponding to the method shown in FIGS. 9 and 9A.
Figure 10A:
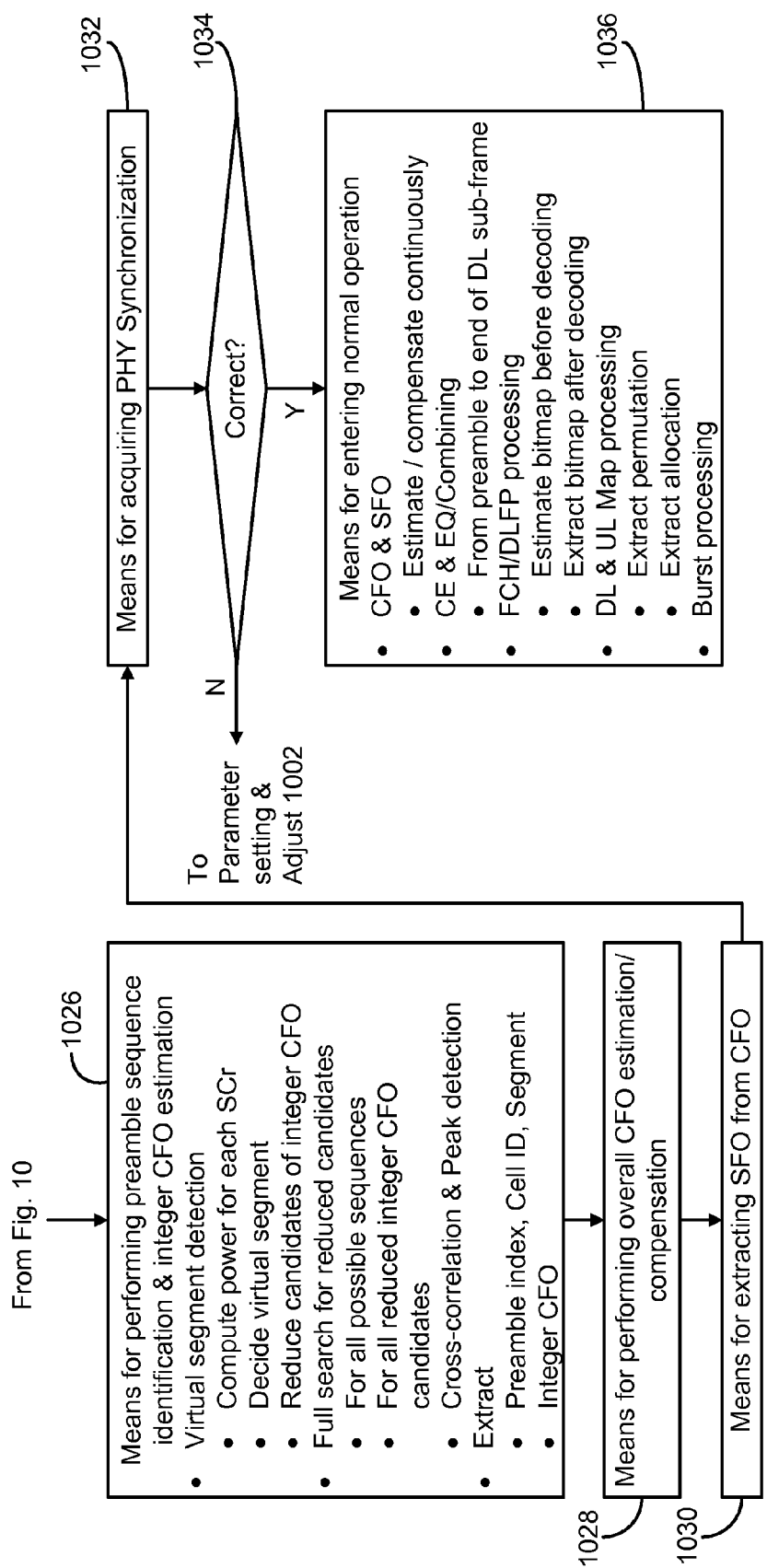

The method 900 of FIGS. 9 and 9A described above may be performed by various hardware and/or software component(s) and/or module(s) corresponding to the means-plus-function blocks 1000 illustrated in FIGS. 10 and 10A. In other words, blocks 902 through 936 illustrated in FIGS. 9 and 9A correspond to means-plus-function blocks 1002 through 1036 illustrated in FIGS. 10 and 10A.

Figure 11:
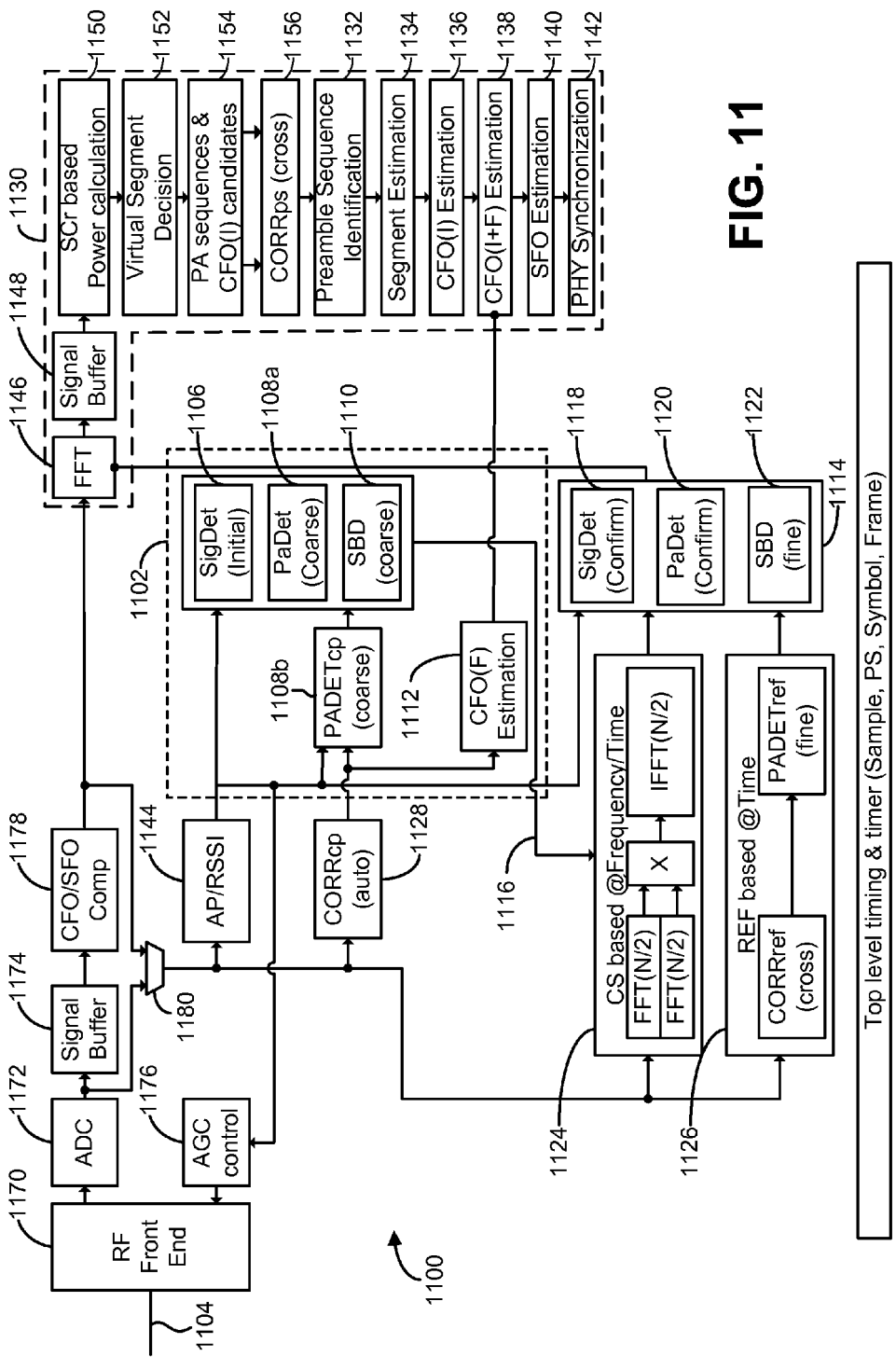
FIG. 11 illustrates an example of a synchronization and detection architecture for a wireless device in a wireless communication system that utilizes OFDM/OFDMA.

FIG. 11 illustrates an example of a synchronization and detection architecture 1100 for a wireless device (e.g., a user terminal 106), which may be part of a wireless communication system 100 that utilizes OFDM/OFDMA. The synchronization and detection architecture 1100 may be used to implement the methods 800, 900 shown in FIGS. 8 and 9-9A.

The synchronization and detection architecture 1100 includes a component 1106 that performs coarse signal detection. This component 1106 may be referred to as a coarse signal detection component 1106. Coarse signal detection may be performed in the manner described above in relation to the methods 800, 900 shown in FIGS. 8 and 9-9A.

The synchronization and detection architecture 1100 also includes components 1108a, 1108b that perform coarse preamble detection. These components 1108a, 1108b may be referred to collectively as a coarse preamble detection component 1108. Coarse preamble detection may be performed in the manner described above in relation to the methods 800, 900 shown in FIGS. 8 and 9-9A.

The synchronization and detection architecture 1100 also includes a component 1110 that performs coarse symbol boundary detection. This component 1110 may be referred to as a coarse symbol boundary detection component 1110. Coarse symbol boundary detection may be performed in the manner described above in relation to the methods 800, 900 shown in FIGS. 8 and 9-9A.

The synchronization and detection architecture 1100 also includes a component 1112 that performs fractional CFO estimation. This component 1112 may be referred to as a fractional CFO estimation component 1112. Fractional CFO estimation may be performed in the manner described above in relation to the methods 800, 900 shown in FIGS. 8 and 9-9A.

The coarse signal detection component 1106, coarse preamble detection component 1108, coarse symbol boundary detection component 1110, and fractional CFO estimation component 1112 may be referred to collectively as a coarse detection and synchronization component 1102. Coarse detection and synchronization may be performed in the manner described above in relation to the methods 800, 900 shown in FIGS. 8 and 9-9A.

The synchronization and detection architecture 1100 also includes a component 1128 that determines CORRcp (i.e., the auto-correlation of the received signal 1104 using the cyclic prefix (CP) property of the preamble 408, as described above). This component 1128 may be referred to herein as a cyclic prefix-based auto-correlation component 1128. CORRcp may be determined in the manner described above in relation to the methods 800, 900 shown in FIGS. 8 and 9-9A.

The synchronization and detection architecture 1100 also includes a component 1144 that determines AP (i.e., the average power of the received signal 1104, as described above). This component 1144 may be referred to herein as an average power determination component 1144. AP may be determined in the manner described above in relation to the methods 800, 900 shown in FIGS. 8 and 9-9A.

The synchronization and detection architecture 1100 also includes a component 1118 that performs fine signal detection. This component 1118 may be referred to herein as a fine signal detection component 1118. Fine signal detection may be performed in the manner described above in relation to the methods 800, 900 shown in FIGS. 8 and 9-9A.

The synchronization and detection architecture 1100 also includes a component 1120 that performs fine preamble detection. This component 1120 may be referred to herein as a fine preamble detection component 1120. Fine preamble detection may be performed in the manner described above in relation to the methods 800, 900 shown in FIGS. 8 and 9-9A.

The synchronization and detection architecture 1100 also includes a component 1122 that performs fine symbol boundary detection. This component 1122 may be referred to herein as a fine symbol boundary detection component 1122. Fine symbol boundary detection may be performed in the manner described above in relation to the methods 800, 900 shown in FIGS. 8 and 9-9A.

The fine signal detection component 1118, fine preamble detection component 1120, and fine symbol boundary detection component 1122 may be referred to collectively as a fine detection and synchronization component 1114. Fine detection and synchronization may be performed in the manner described above in relation to the methods 800, 900 shown in FIGS. 8 and 9-9A.

As indicated above, results 1116 of the coarse detection and synchronization may be used for the fine detection and synchronization. For example, once an incoming signal is recognized as a candidate, then the candidate may be delivered to the fine detection and synchronization component 1114 with related information like timing and frequency offset. Thus, the results 1116 of the coarse detection and synchronization that are used for the fine detection and synchronization may include one or more candidate signals, and related information like timing information and frequency offset information corresponding to the candidate signal(s).

The synchronization and detection architecture 1100 also includes a component 1124 that determines CORRcs (i.e., the auto-correlation of delivered candidate preamble signal(s) using the conjugate symmetric (CS) property of the preamble 408, as described above). This component 1124 may be referred to herein as a conjugate symmetric-based auto-correlation component 1124. CORRcs may be determined in the manner described above in relation to the methods 800, 900 shown in FIGS. 8 and 9-9A.

As indicated above, CORRcs may be determined in the time domain or in the frequency domain. FIG. 11 shows CORRcs being determined in the frequency domain.

The synchronization and detection architecture 1100 also includes a component 1126 that determines CORRref (i.e., the cross-correlation of the preamble 408 with respect to a reference preamble, as described above). This component 1126 may be referred to herein as a reference cross-correlation component 1126. CORRref may be determined in the manner described above in relation to the methods 800, 900 shown in FIGS. 8 and 9-9A.

The synchronization and detection architecture 1100 also includes various components that may be utilized when the acquisition of the received signal 1104 has been achieved (i.e., when tracking mode 908 has been entered). Collectively, these components may be referred to as a tracking mode processing component 1130.

The tracking mode processing component 1130 includes a component 1146 that performs the fast Fourier transform (FFT). This component 1146 may be referred to as an FFT component 1146.

The tracking mode processing component 1130 also includes a signal buffer 1148. The signal buffer 1148 may be used to store the output of the FFT component 1146.

The tracking mode processing component 1130 also includes a component 1150 that determines the power of each sub-carrier 314. This component 1150 may be referred to as a sub-carrier power calculation component 1150.

The tracking mode processing component 1130 also includes a component 1152 that determines a virtual segment for purposes of identifying a reduced set of integer CFO candidates. This component 1152 may be referred to as a virtual segment decision component 1152. The virtual segment may be determined in the manner described above in relation to the methods 800, 900 shown in FIGS. 8 and 9-9A.

The tracking mode processing component 1130 also includes a component 1154 that identifies a reduced set of integer CFO candidates based on the virtual segment that is identified. This component 1154 may be referred to as a candidate reduction component 1154. The reduced set of integer CFO candidates may be determined in the manner described above in relation to the methods 800, 900 shown in FIGS. 8 and 9-9A.

The tracking mode processing component 1130 also includes a component 1156 that determines CORRps (i.e., the cross-correlation between the received signal 1104 and possible preamble sequences 506, as discussed above). This component 1156 may be referred to as a preamble sequence cross-correlation component 1156. CORRps may be determined in the manner described above in relation to the methods 800, 900 shown in FIGS. 8 and 9-9A.

The tracking mode processing component 1130 also includes a component 1132 that performs preamble sequence identification, i.e., that identifies the preamble sequence 506 within the signal 1104 that is received from the base station 104. This component 1132 may be referred to herein as a preamble sequence identification component 1132. Preamble sequence identification may be performed in the manner described above in relation to the methods 800, 900 shown in FIGS. 8 and 9-9A.

The tracking mode processing component 1130 also includes a component 1134 that performs segment estimation, i.e., that determines the segment to which the transmitting base station 104 corresponds. This component 1134 may be referred to herein as a segment estimation component 1134. Segment estimation may be performed in the manner described above in relation to the methods 800, 900 shown in FIGS. 8 and 9-9A.

The tracking mode processing component 1130 also includes a component 1136 that performs integer CFO estimation, i.e., that determines the integer CFO of the received signal 1104. This component 1136 may be referred to herein as an integer CFO estimation component 1136. Integer CFO estimation may be performed in the manner described above in relation to the methods 800, 900 shown in FIGS. 8 and 9-9A.

The tracking mode processing component 1130 also includes a component 1138 that performs overall CFO estimation, i.e., that determines the overall CFO (both integer CFO and fractional CFO) of the received signal 1104. This component 1138 may be referred to herein as an overall CFO estimation component 1138. Overall CFO estimation may be performed in the manner described above in relation to the methods 800, 900 shown in FIGS. 8 and 9-9A.

The tracking mode processing component 1130 also includes a component 1140 that performs sampling frequency offset (SFO) estimation. This component 1140 may be referred to as an SFO estimation component 1140. SFO estimation may be performed in the manner described above in relation to the methods 800, 900 shown in FIGS. 8 and 9-9A.

The tracking mode processing component 1130 also includes a component 1142 that performs physical layer (PHY) synchronization. This component 1142 may be referred to as a physical layer synchronization component 1142. Physical layer synchronization may be performed in the manner described above in relation to the methods 800, 900 shown in FIGS. 8 and 9-9A.

The synchronization and detection architecture 1100 also includes a component 1178 that performs CFO/SFO compensation. This component 1178 may be referred to as a CFO/SFO compensation component 1178. CFO/SFO compensation may be performed in the manner described above in relation to the methods 800, 900 shown in FIGS. 8 and 9-9A.

A neighbor cell search capability may be provided during normal operation 936. The neighbor cell search capability will now be described briefly.

During normal operation after acquiring all needed synchronization for the serving cell, the neighbor cell's information (especially focused on preamble sequences for synchronization purposes or cell search purposes) may or may not be known from the serving base station 104. One of two approaches may be used for a neighbor cell search. One approach is to use CORRref (cross-correlation using the reference preamble pattern) using time domain processing, and the other is to use CORRcs (conjugate symmetric based correlation) and preamble sequence identification using frequency/time domain processing.

The first scheme (CORRref based) may be used when the user terminal 106 knows the neighbor cell's information so the user terminal 106 knows the neighbor cell's preamble sequences that are used in the corresponding base stations 104. Based on the known preamble sequences, the user terminal 106 may search the neighbor cell's timing (symbol boundary) using a CORRref correlator.

The second scheme may be used whether the user terminal 106 knows the neighbor cell's information or not. If the neighbor cell's information is not available, the user terminal 106 may search the neighbor cell using the similar scheme used in initial synchronization described above; however, searching efforts may be reduced using already known information (i.e., the coarse synchronization may be omitted because it may be assumed that the neighbor cell shall use almost the same timing as the serving base station 104). It may be assumed that there is no integer frequency offset, because all base stations 104 may use an oscillator as defined in the standard specification, and after synchronization with the serving cell this integer frequency offset will likely be zero. Thus, the preamble sequence identification may be done using reduced candidates corresponding to no integer frequency offset. In addition, power calculation and virtual segment detection may be omitted for the same reason. The serving cell's symbol boundary position may be excluded from the neighbor cell's symbol boundary detection process.

If the neighbor cell's information is available, the searching and synchronization processes for neighbor cells may be simplified by using the known information. For example, the coarse synchronization may be omitted. Also, it may be assumed that there is zero integer frequency offset. The preamble sequence identification may be done using the only one known preamble sequence per corresponding base station 104.

The synchronization and detection architecture 1100 also includes a radio frequency (RF) front end 1170, an analog-to-digital converter (ADC) 1172, a signal buffer 1174, and an automatic gain control unit 1 176. The output of the ADC 1172 and the output of the CFO/SFO compensation component 1178 are provided to a multiplexer 1180, which multiplexes these outputs to the average power determination component 1144, the cyclic prefix-based auto-correlation component 1128, the conjugate symmetric-based auto-correlation component 1124, and the reference cross-correlation component 1126.

The synchronization and detection methods described herein may provide fast signal detection, fast preamble detection, fast searching for the preamble sequence 506 and the segment 510, and fast integer CFO estimation. For example, with the synchronization and detection methods described herein, it may be possible to achieve symbol boundary detection within two symbols (one for coarse symbol boundary detection, and one for fine symbol boundary detection). Similarly, using the synchronization and detection methods described herein it may be possible to detect a preamble sequence within one frame. This allows real-time processing capability.

These results may be achieved with relatively low complexity. For example, as discussed above, CORRcs (i.e., the auto-correlation of delivered candidate preamble signal(s) using the conjugate symmetric (CS) property of the preamble 408) may be used for purposes of signal and/or preamble detection. Auto-correlation operations based on the CS property of the preamble 408 may be less complex than other types of auto-correlation operations that may be used for signal and/or preamble detection. As another example, preamble sequence identification may be performed with respect to a reduced set of integer CFO candidates. This also may contribute to the reduced complexity of the methods and apparatus described herein.

The methods and apparatus described herein may provide real-time processing capability by reducing computation complexity. For example, processing may occur within one symbol for coarse synchronization and fine synchronization, respectively. Processing may occur within one frame for preamble sequence identification and integer carrier frequency offset estimation.

IEEE C802.16e-04/327r1 describes several synchronization and detection schemes, including a scheme that may be referred to as a "brute force" search scheme. A comparison will now be made between the method 900 shown in FIGS. 9 and 9A and the brute force search scheme described in IEEE C802.16e-04/327r1. Information regarding the complexity of the brute force search scheme may be found in IEEE C802.16e-04/327r1.

Table 1 includes certain information that compares the method 900 shown in FIGS. 9 and 9A with the brute force search scheme that is described in IEEE C802.16e-04/327r1. It is assumed that $N_{SEQ}$=284, $N_{FFT}$=1024, M=42, $N_{CP}$=128, and $N_{INT}$=24. The number of required computations are for a duration of one frame. The "worst case" refers to the situation where there is a false detection at the coarse synchronization stage. Except for the "worst case," it is assumed that there are no false detections.

TABLE 1

Comparison of the method shown in FIGS. 9 and 9A with the brute force search scheme that is described in IEEE C802.16e-04/327r1.

|  | Brute force search | Method of FIGS. 9 and 9A (Coarse + Fine) |
| --- | --- | --- |
| Number of FFTs | 48,384 FFTs | 3 FFTs or 85 FFTs in the worst case |
| Number of complex multipliers | 777,024 (This number of multiplications is required per FFT) | 265,038 or 286,030 in the worst case |
| Comments on real time processing. (Real time means that processing capability of incoming signal) | Real time processing is almost impossible to implement this scheme considering the computation complexity | All coarse and fine synchronization processing can be processed in real time so this scheme can provide fast searching capability. |

Figure 12:
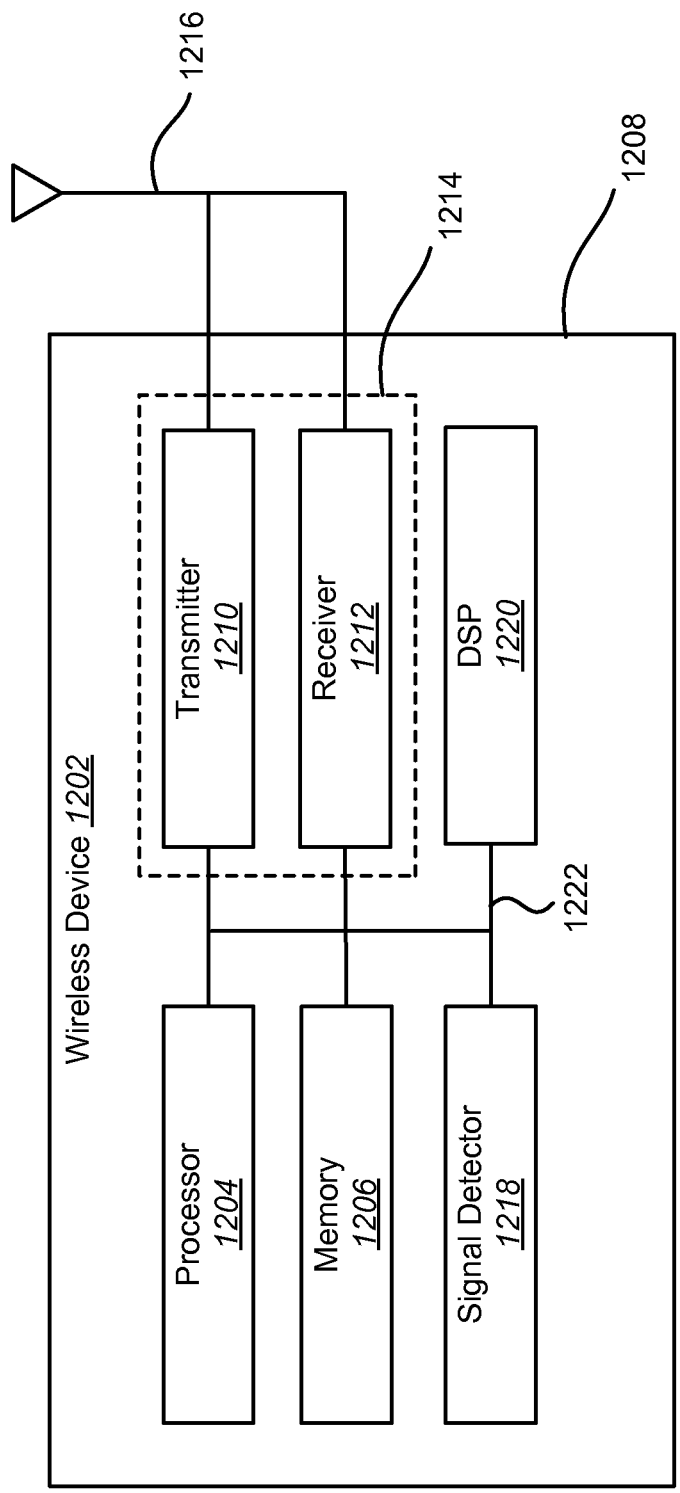
FIG. 12 illustrates various components that may be utilized in a wireless device.

FIG. 12 illustrates various components that may be utilized in a wireless device 1202. The wireless device 1202 is an example of a device that may be configured to implement the various methods described herein. The wireless device 1202 may be a base station 104 or a user terminal 106.

The wireless device 1202 may include a processor 1204 which controls operation of the wireless device 1202. The processor 1204 may also be referred to as a central processing unit (CPU). Memory 1206, which may include both read-only memory (ROM) and random access memory (RAM), provides instructions and data to the processor 1204. A portion of the memory 1206 may also include non-volatile random access memory (NVRAM). The processor 1204 typically performs logical and arithmetic operations based on program instructions stored within the memory 1206. The instructions in the memory 1206 may be executable to implement the methods described herein.

The wireless device 1202 may also include a housing 1208 that may include a transmitter 1210 and a receiver 1212 to allow transmission and reception of data between the wireless device 1202 and a remote location. The transmitter 1210 and receiver 1212 may be combined into a transceiver 1214. An antenna 1216 may be attached to the housing 1208 and electrically coupled to the transceiver 1214. The wireless device 1202 may also include (not shown) multiple transmitters, multiple receivers, multiple transceivers and/or multiple antenna.

The wireless device 1202 may also include a signal detector 1218 that may be used to detect and quantify the level of signals received by the transceiver 1214. The signal detector 1218 may detect such signals as total energy, pilot energy per pseudonoise (PN) chips, power spectral density, and other signals. The wireless device 1202 may also include a digital signal processor (DSP) 1220 for use in processing signals.

The various components of the wireless device 1202 may be coupled together by a bus system 1222 which may include a power bus, a control signal bus, and a status signal bus in addition to a data bus. However, for the sake of clarity, the various busses are illustrated in FIG. 12 as the bus system 1222.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 9-10, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A synchronization and detection method performed by a wireless device, comprising:
    performing a physical layer synchronization process to determine whether a physical layer synchronization has been established;
    performing coarse detection and synchronization with respect to a received signal;
    performing fine detection and synchronization for acquisition of the received signal, wherein results of the coarse detection and synchronization are used for the fine detection and synchronization, wherein the coarse detection and synchronization and the fine detection and synchronization are performed concurrently; and
    performing tracking mode processing in response to the acquisition of the received signal.

2. The method of claim 1, wherein performing the coarse detection and synchronization comprises:
    performing coarse signal detection;
    performing coarse preamble detection;
    performing coarse symbol boundary detection; and
    performing fractional carrier frequency offset estimation.

3. The method of claim 1, wherein performing the fine detection and synchronization comprises:
    performing fine signal detection;
    performing fine preamble detection; and
    performing fine symbol boundary detection.

4. The method of claim 1, wherein performing the coarse detection and synchronization comprises determining auto-correlation of the received signal using a cyclic prefix property of a preamble.

5. The method of claim 4, wherein determining auto-correlation of the received signal using a cyclic prefix property of a preamble, comprises:
    applying a fast fourier transform to two halves of the preamble;
    referencing a symbol boundary by a timing hypothesis;
    employing a convolution function that dot-multiplies each sub-carrier in a frequency domain;
    applying an inverse fast fourier transform the a result of the convolution function.

6. The method of claim 1, wherein performing the fine detection and synchronization comprises determining auto-correlation of at least one candidate preamble signal using a conjugate symmetric property of a preamble.

7. The method of claim 1, wherein performing the fine detection and synchronization comprises determining cross-correlation of a preamble with respect to a reference preamble.

8. The method of claim 1, wherein performing the tracking mode processing comprises determining cross-correlation between the received signal and possible preamble sequences.

9. The method of claim 1, further comprising performing a sampling frequency offset estimation and compensation process.

10. The method of claim 1, wherein the wireless device is configured for use within a wireless communication system that utilizes orthogonal frequency division multiplexing.

11. The method of claim 1, wherein the wireless device is a user terminal.

12. A wireless device that performs synchronization and detection with respect to a received signal, comprising:
- a component for performing a physical layer synchronization process to determine whether a physical layer synchronization has been established;
- a coarse detection and synchronization component configured to perform coarse detection and synchronization with respect to the received signal;
- a fine detection and synchronization component configured to perform fine detection and synchronization for acquisition of the received signal, wherein results of the coarse detection and synchronization are used for the fine detection and synchronization, wherein the coarse detection and synchronization and the fine detection and synchronization are configured to perform concurrently; and
- a tracking mode processing component configured to perform tracking mode processing in response to the acquisition of the received signal.

13. The wireless device of claim 12, wherein the coarse detection and synchronization component comprises:
- a coarse signal detection component configured to perform coarse signal detection;
- a coarse preamble detection component configured to perform coarse preamble detection;
- a coarse symbol boundary detection component configured to perform coarse symbol boundary detection; and
- a coarse fractional carrier frequency offset estimation component configured to perform fractional carrier frequency offset estimation.

14. The wireless device of claim 12, wherein the fine detection and synchronization component comprises:
- a fine signal detection component configured to perform fine signal detection;
- a fine preamble detection component configured to perform fine preamble detection; and
- a fine symbol boundary detection component configured to perform fine symbol boundary detection.

15. The wireless device of claim 12, wherein the coarse detection and synchronization component comprises a cyclic prefix-based auto-correlation component configured to determine auto-correlation of the received signal using a cyclic prefix property of a preamble.

16. The wireless device of claim 12, wherein the fine detection and synchronization component comprises a conjugate symmetric-based auto-correlation component configured to determine auto-correlation of at least one candidate preamble signal using a conjugate symmetric property of a preamble.

17. The wireless device of claim 12, wherein the fine detection and synchronization component comprises a reference cross-correlation component configured to determine cross-correlation of a preamble with respect to a reference preamble.

18. The wireless device of claim 12, wherein the tracking mode processing component comprises a preamble sequence cross-correlation component configured to determine cross-correlation between the received signal and possible preamble sequences.

19. The wireless device of claim 12, further comprising a component for performing a sampling frequency offset estimation and compensation process.

20. The wireless device of claim 12, wherein the wireless device is configured for use within a wireless communication system that utilizes orthogonal frequency division multiplexing.

21. The wireless device of claim 12, wherein the wireless device is a user terminal.

22. An apparatus that performs synchronization and detection with respect to a received signal, comprising:
- means for performing a physical layer synchronization process to determine whether a physical layer synchronization has been established;
- means for performing coarse detection and synchronization with respect to a received signal;
- means for performing fine detection and synchronization for acquisition of the received signal, wherein results of the coarse detection and synchronization are used for the fine detection and synchronization, wherein the coarse detection and synchronization and the fine detection and synchronization are performed concurrently; and
- means for performing tracking mode processing in response to the acquisition of the received signal.

23. The apparatus of claim 22, wherein the means for performing the coarse detection and synchronization comprises:
- means for performing coarse signal detection;
- means for performing coarse preamble detection;
- means for performing coarse symbol boundary detection; and
- means for performing fractional carrier frequency offset estimation.

24. The apparatus of claim 22, wherein the means for performing the fine detection and synchronization comprises:
- means for performing fine signal detection;
- means for performing fine preamble detection; and
- means for performing fine symbol boundary detection.

25. The apparatus of claim 22, wherein the means for performing the coarse detection and synchronization comprises means for determining auto-correlation of the received signal using a cyclic prefix property of a preamble.

26. The apparatus of claim 22, wherein the means for performing the fine detection and synchronization comprises means for determining auto-correlation of at least one candidate preamble signal using a conjugate symmetric property of a preamble.

27. The apparatus of claim 22, wherein the means for performing the fine detection and synchronization comprises means for determining cross-correlation of a preamble with respect to a reference preamble.

28. The apparatus of claim 22, wherein the means for performing the tracking mode processing comprises means for determining cross-correlation between the received signal and possible preamble sequences.

29. The apparatus of claim 22, further comprising means for performing a sampling frequency offset estimation and compensation process.

30. The apparatus of claim 22, wherein the apparatus is configured for use within a wireless communication system that utilizes orthogonal frequency division multiplexing.

31. The apparatus of claim 22, wherein the apparatus is a user terminal.

32. A computer-program product for performing synchronization and detection with respect to a received signal, the computer-program product comprising a non-transitory computer readable medium having instructions thereon, the instructions comprising:
- code for performing a physical layer synchronization process to determine whether a physical layer synchronization has been established;
- code for performing coarse detection and synchronization with respect to a received signal;
- code for performing fine detection and synchronization for acquisition of the received signal, wherein results of the coarse detection and synchronization are used for the fine detection and synchronization, wherein the coarse detection and synchronization and the fine detection and synchronization are performed concurrently; and
code for performing tracking mode processing in response to the acquisition of the received signal.

33. The computer-program product of claim 32, wherein the code for performing the coarse detection and synchronization comprises:
code for performing coarse signal detection;
code for performing coarse preamble detection;
code for performing coarse symbol boundary detection; and
code for performing fractional carrier frequency offset estimation.

34. The computer-program product of claim 32, wherein the code for performing the fine detection and synchronization comprises:
code for performing fine signal detection;
code for performing fine preamble detection; and
code for performing fine symbol boundary detection.

35. The computer-program product of claim 32, wherein the code for performing the coarse detection and synchronization comprises code for determining auto-correlation of the received signal using a cyclic prefix property of a preamble.

36. The computer-program product of claim 32, wherein the code for performing the fine detection and synchronization comprises code for determining auto-correlation of at least one candidate preamble signal using a conjugate symmetric property of a preamble.

37. The computer-program product of claim 32, wherein the code for performing the fine detection and synchronization comprises code for determining cross-correlation of a preamble with respect to a reference preamble.

38. The computer-program product of claim 32, wherein the code for performing the tracking mode processing comprises code for determining cross-correlation between the received signal and possible preamble sequences.

39. The computer-program product of claim 32, further comprising code for performing a sampling frequency offset estimation and compensation process.

40. The computer-program product of claim 32, wherein the computer-program product is configured for use within a wireless device that is part of a wireless communication system that utilizes orthogonal frequency division multiplexing.

41. The computer-program product of claim 32, wherein the computer-program product is configured for use within a user terminal.

42. A synchronization and detection method performed by a wireless device, comprising:
performing coarse detection and synchronization with respect to a received signal;
performing fine detection and synchronization for acquisition of the received signal, wherein results of the coarse detection and synchronization are used for the fine detection and synchronization; and
performing tracking mode processing in response to the acquisition of the received signal, wherein performing tracking mode processing further comprises:
performing preamble sequence identification;
performing integer carrier frequency offset estimation;
performing segment estimation;
performing sampling frequency offset estimation; and
performing physical layer synchronization.

43. A wireless device that performs synchronization and detection with respect to a received signal, comprising:
a coarse detection and synchronization component configured to perform coarse detection and synchronization with respect to the received signal;
a fine detection and synchronization component configured to perform fine detection and synchronization for acquisition of the received signal, wherein results of the coarse detection and synchronization are used for the fine detection and synchronization; and
a tracking mode processing component configured to perform tracking mode processing in response to the acquisition of the received signal, comprising:
a preamble sequence identification component configured to perform preamble sequence identification;
an integer carrier frequency offset estimation component configured to perform integer carrier frequency offset estimation;
a segment estimation component configured to perform segment estimation;
a sampling frequency offset estimation component configured to perform sampling frequency offset estimation; and
a physical layer synchronization component configured to perform physical layer synchronization.

44. An apparatus that performs synchronization and detection with respect to a received signal, comprising:
means for performing coarse detection and synchronization with respect to a received signal;
means for performing fine detection and synchronization for acquisition of the received signal, wherein results of the coarse detection and synchronization are used for the fine detection and synchronization; and
means for performing tracking mode processing in response to the acquisition of the received signal, comprising:
means for performing preamble sequence identification;
means for performing integer carrier frequency offset estimation;
means for performing segment estimation;
means for performing sampling frequency offset estimation; and
means for performing physical layer synchronization.

45. A computer-program product for performing synchronization and detection with respect to a received signal, the computer-program product comprising a computer readable medium having instructions thereon, the instructions comprising:
code for performing coarse detection and synchronization with respect to a received signal;
code for performing fine detection and synchronization for acquisition of the received signal, wherein results of the coarse detection and synchronization are used for the fine detection and synchronization; and
code for performing tracking mode processing in response to the acquisition of the received signal, comprising:
code for performing preamble sequence identification;
code for performing integer carrier frequency offset estimation;
code for performing segment estimation;
code for performing sampling frequency offset estimation; and
code for performing physical layer synchronization.

* * * * *